(12) United States Patent
Kaufman

(10) Patent No.: US 10,761,683 B2
(45) Date of Patent: Sep. 1, 2020

(54) SYSTEM AND PROCESS FOR CONTROLLING A COMPUTERIZED ENTERTAINMENT PROPERTY PLAYLIST

(71) Applicant: Jason Scott Kaufman, New York City, NY (US)

(72) Inventor: Jason Scott Kaufman, New York City, NY (US)

(73) Assignee: STATIONHEAD, INC., Brooklyn, NY (US)

( * ) Notice: Subject to any disclaimer, the term of this patent is extended or adjusted under 35 U.S.C. 154(b) by 731 days.

(21) Appl. No.: 14/702,579

(22) Filed: May 1, 2015

(65) Prior Publication Data

US 2015/0324832 A1    Nov. 12, 2015

Related U.S. Application Data

(60) Provisional application No. 61/988,145, filed on May 2, 2014, provisional application No. 62/100,465, filed on Jan. 6, 2015.

(51) Int. Cl.
*G06Q 30/00* (2012.01)
*G06F 3/0482* (2013.01)
(Continued)

(52) U.S. Cl.
CPC ........ *G06F 3/0482* (2013.01); *G06F 3/04842* (2013.01); *G06Q 30/02* (2013.01);
(Continued)

(58) Field of Classification Search
CPC ... G06F 3/0482; G06F 3/04842; G06Q 50/00; G06Q 30/02; G06Q 30/0226;
(Continued)

(56) References Cited

U.S. PATENT DOCUMENTS 9,224,385 B1 * 12/2015 Sharifi .................... G10L 25/51
9,584,591 B1 *  2/2017 Weel ...................... G08C 17/02
(Continued)

OTHER PUBLICATIONS

Margoukanis, Dimitrios, et al. "SEAM: A Sound-Embedded Advertisement Model for Online Digital Music Distribution." IEEE, Aristotle University of Thessaloniki, 2006. (Year: 2006).*

*Primary Examiner* — Luis A Brown
(74) *Attorney, Agent, or Firm* — Collard & Roe, P.C.

(57) ABSTRACT

Disclosed is a process and a system for controlling a computerized entertainment property playlist comprising registering a user and also registering an owner of the entertainment property. Next, the user can select, or allow a system to select on their behalf, entertainment property units owned by the owner, to be played on a playlist. Next, the system can be configured to store information relating to the registered user, the registered owner, and the media units in at least one database. Next, process can result in exporting the playlist via instructions sent by a microprocessor to at least one additional database. Next, the system can involve playing the entertainment property, or syncing multiple entertainment properties, on the playlist. Finally the system can involve rewarding the user based upon a number of units played of the media units and a duration of play of each of these media units.

9 Claims, 36 Drawing Sheets

(51) Int. Cl.
   G06Q 30/02    (2012.01)
   G06Q 50/00    (2012.01)
   G06F 3/0484   (2013.01)
   H04L 29/06    (2006.01)
   H04L 12/58    (2006.01)
   H04N 21/4784  (2011.01)
   H04L 29/08    (2006.01)
   H04N 21/442   (2011.01)
   H04N 21/262   (2011.01)

(52) U.S. Cl.
   CPC ..... *G06Q 30/0215* (2013.01); *G06Q 30/0226* (2013.01); *G06Q 50/00* (2013.01); *G06Q 50/01* (2013.01); *H04L 51/046* (2013.01); *H04L 65/60* (2013.01); *H04L 67/22* (2013.01); *H04N 21/26258* (2013.01); *H04N 21/44222* (2013.01); *H04N 21/4784* (2013.01)

(58) Field of Classification Search
   CPC ............... G06Q 30/0215; G06Q 50/01; H04N 21/4784; H04N 21/44222; H04N 21/26258; H04L 67/22; H04L 65/60; H04L 51/046
   USPC .......................................... 705/14.17, 14.27
   See application file for complete search history.

(56)         References Cited

U.S. PATENT DOCUMENTS

| | | | |
|---|---|---|---|
| 2007/0039036 A1* | 2/2007 | Sullivan | H04N 21/4882 725/133 |
| 2007/0192784 A1* | 8/2007 | Postrel | G06Q 30/0224 725/23 |
| 2008/0010153 A1* | 1/2008 | Pugh-O'Connor | G06Q 30/02 705/14.15 |
| 2009/0061764 A1* | 3/2009 | Lockhart | G06F 16/68 455/3.06 |
| 2009/0083541 A1* | 3/2009 | Levine | G06Q 30/0603 713/165 |
| 2009/0089352 A1* | 4/2009 | Davis | H04N 21/812 709/201 |
| 2009/0107320 A1* | 4/2009 | Willacy | G10H 7/00 84/609 |
| 2012/0045002 A1* | 2/2012 | Zivkovic | G06F 21/335 375/259 |
| 2012/0129476 A1* | 5/2012 | Whikehart | H04B 1/082 455/179.1 |
| 2012/0167146 A1* | 6/2012 | Incorvia | H04N 21/4725 725/60 |
| 2013/0007815 A1* | 1/2013 | Jackson | H04N 21/812 725/63 |
| 2013/0198770 A1* | 8/2013 | Xiong | H04N 21/2381 725/25 |
| 2015/0070585 A1* | 3/2015 | Sharif-Ahmadi | H04N 21/4667 348/564 |
| 2015/0310476 A1* | 10/2015 | Gadwa | G06Q 30/0226 705/14.27 |
| 2015/0324832 A1* | 11/2015 | Kaufman | H04L 67/22 705/14.17 |
| 2016/0110064 A1* | 4/2016 | Shapira | H04L 67/10 705/14.27 |

* cited by examiner

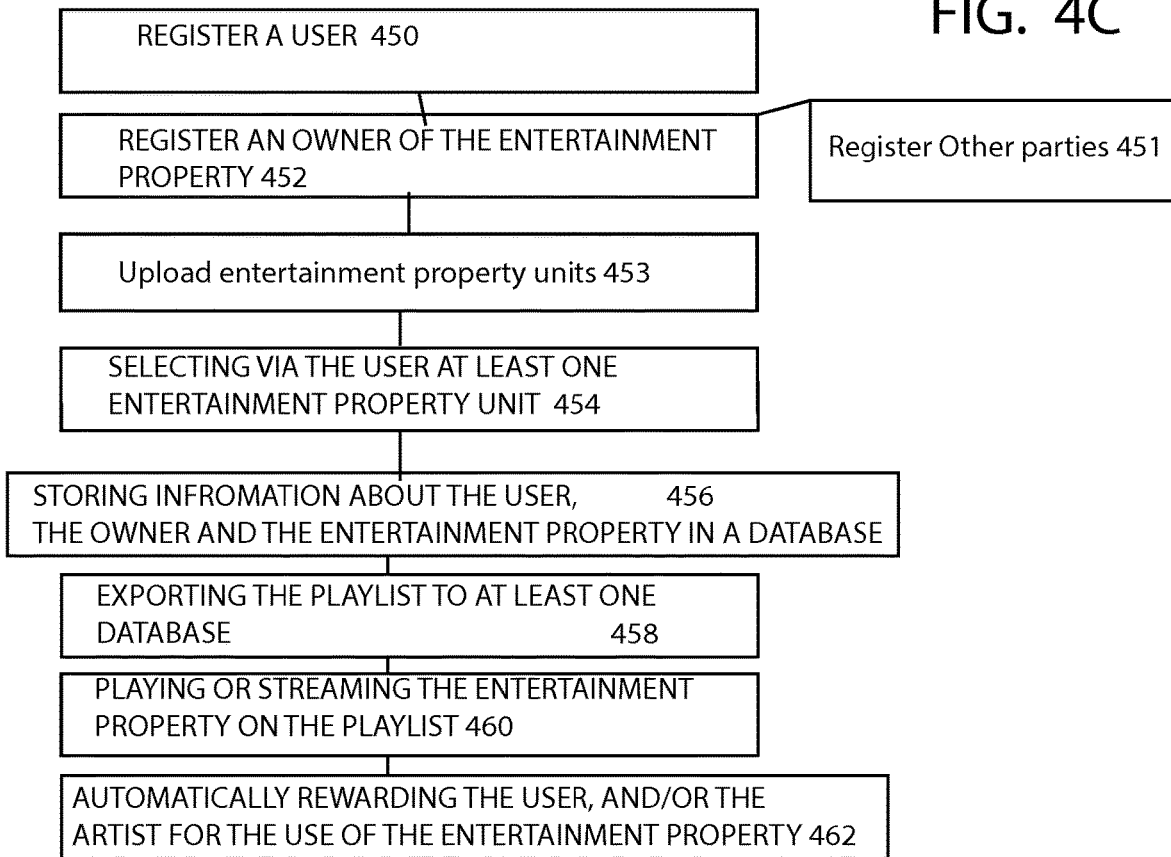

800 Auto Play App Elements    FIG. 8A
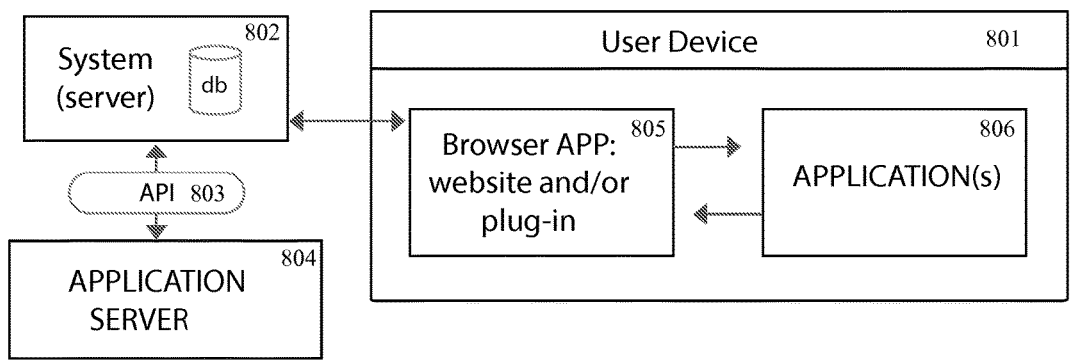
808 Listener App Elements    FIG. 8B
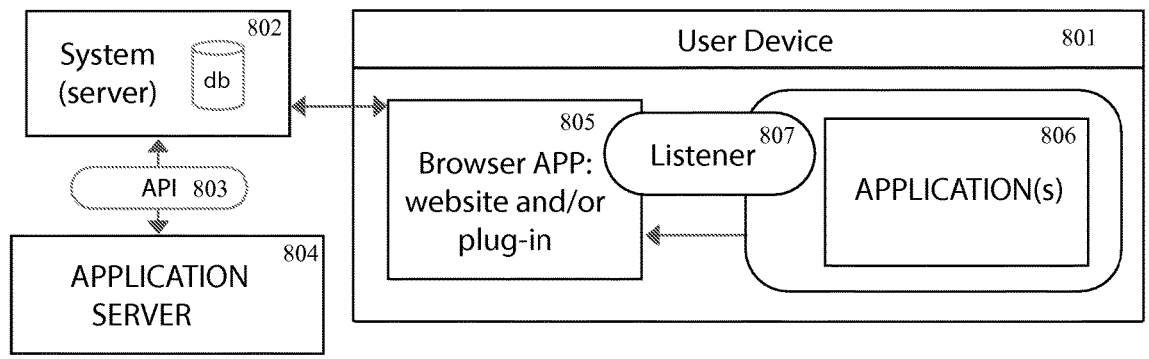

FIG. 30A
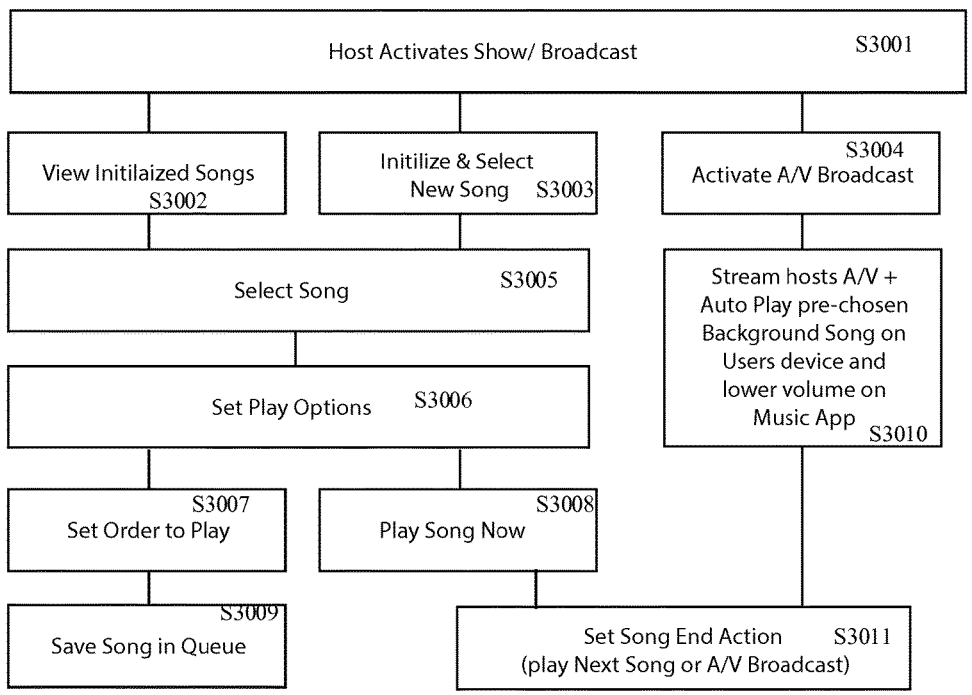
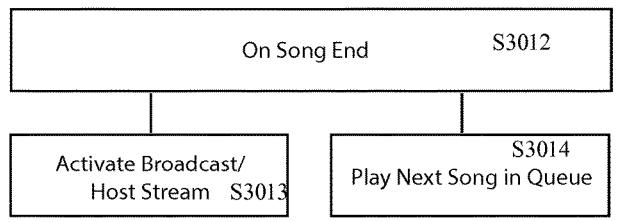
FIG. 30B

FIG. 34A
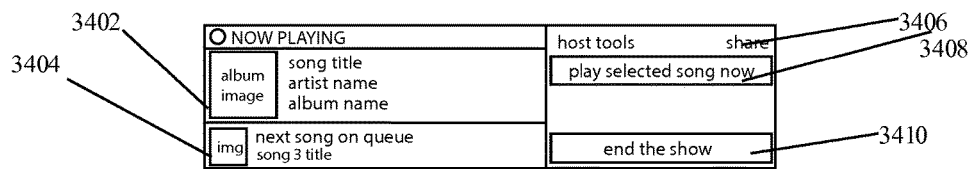
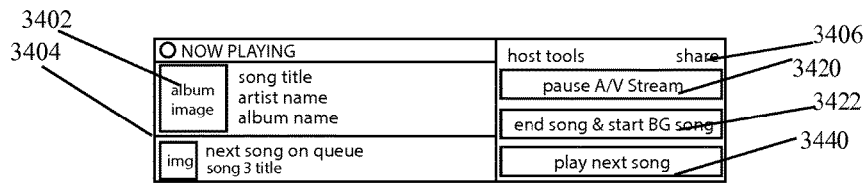
FIG. 34B
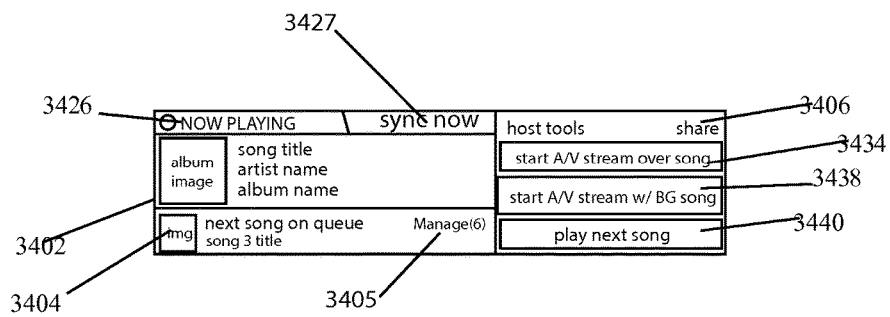
FIG. 34C
FIG. 34D

SYSTEM AND PROCESS FOR CONTROLLING A COMPUTERIZED ENTERTAINMENT PROPERTY PLAYLIST

CROSS REFERENCE TO RELATED APPLICATIONS

This application is a non-provisional application that hereby claims priority from U.S. Provisional Patent Application Ser. No. 61/988,145 filed on May 2, 2014 and U.S. Provisional Patent Application Ser. No. 62/100,465 filed on Jan. 6, 2015 the disclosures of these applications are hereby incorporated herein by reference in their entirety.

BACKGROUND

One embodiment of the invention relates to a system and process for controlling a computerized entertainment property playlist.

SUMMARY

At least one embodiment of the invention relates to a process for controlling a computerized entertainment property playlist comprising registering a user and also registering an owner of the entertainment property. Next, the user can select or allow a system to select on their behalf entertainment property units owned by the owner, to be played on a playlist. Next, the system can be configured to store information relating to the registered user, the registered owner, and the media units in at least one database. Next, process can result in exporting the playlist via instructions sent by a microprocessor to at least one additional database. Next, the system can involve playing the entertainment property or syncing multiple entertainment properties on the playlist. Finally the system can involve rewarding the user based upon a number of units played of the media units and a duration of play of each of these media units. At least one second embodiment of the invention relates to a process for monitoring/listening to a computerized entertainment property playlist via a secondary computerized entertainment property, comprising registering a user and also registering an owner of the entertainment property. Next, the system can be configured to store information relating to the registered user, the registered owner, and the media units in at least one database. Next, the user plays media on a computerized entertainment property playlist being monitored by the secondary computerized entertainment property. Next, process can result in exporting the played playlist via instructions sent by a microprocessor to at least one additional database. Finally the system can involve rewarding the user based upon a number of units played of the media units and a duration of play of each of these media units.

The system is configured to rapidly synthesize a plurality of data components and then to transform these data components including users, playlists, media units, and associated rewards to simultaneously perform a plurality of calculations simultaneously for multiple users such as tens of users, hundreds of users, thousands of users, or even millions of users to determine the most profitable, or at least the most beneficial means for voting on or using data that would lead to a benefit to a user.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention. In the drawings, wherein similar reference characters denote similar elements throughout the several views:

FIG. 4C shows a flow chart for at least one preferred process for at least one embodiment of the invention;

FIG. 8A is a schematic block diagram of additional components that can be used for example with the process of FIG. 4A, or the process of FIG. 7A, or 9-22;

FIG. 8B is a schematic block diagram of additional components that can be used for example with the process of FIG. 4A or the process of FIG. 7A or 9-22;

FIG. 30A is a flow chart showing the process for the flow of information between parties during a broadcast;

FIG. 30B is a flow chart for the process for transferring information between parties;

FIG. 34A is a first embodiment of a section of the screen shown in FIG. 33;

FIG. 34B is a second embodiment of a section of a screen shown in FIG. 33;

FIG. 34C is a third embodiment of a section of a screen shown in FIG. 33;

FIG. 34D is another view of another screen for use with the screen of FIG. 33;

DETAILED DESCRIPTION

Figure 1:
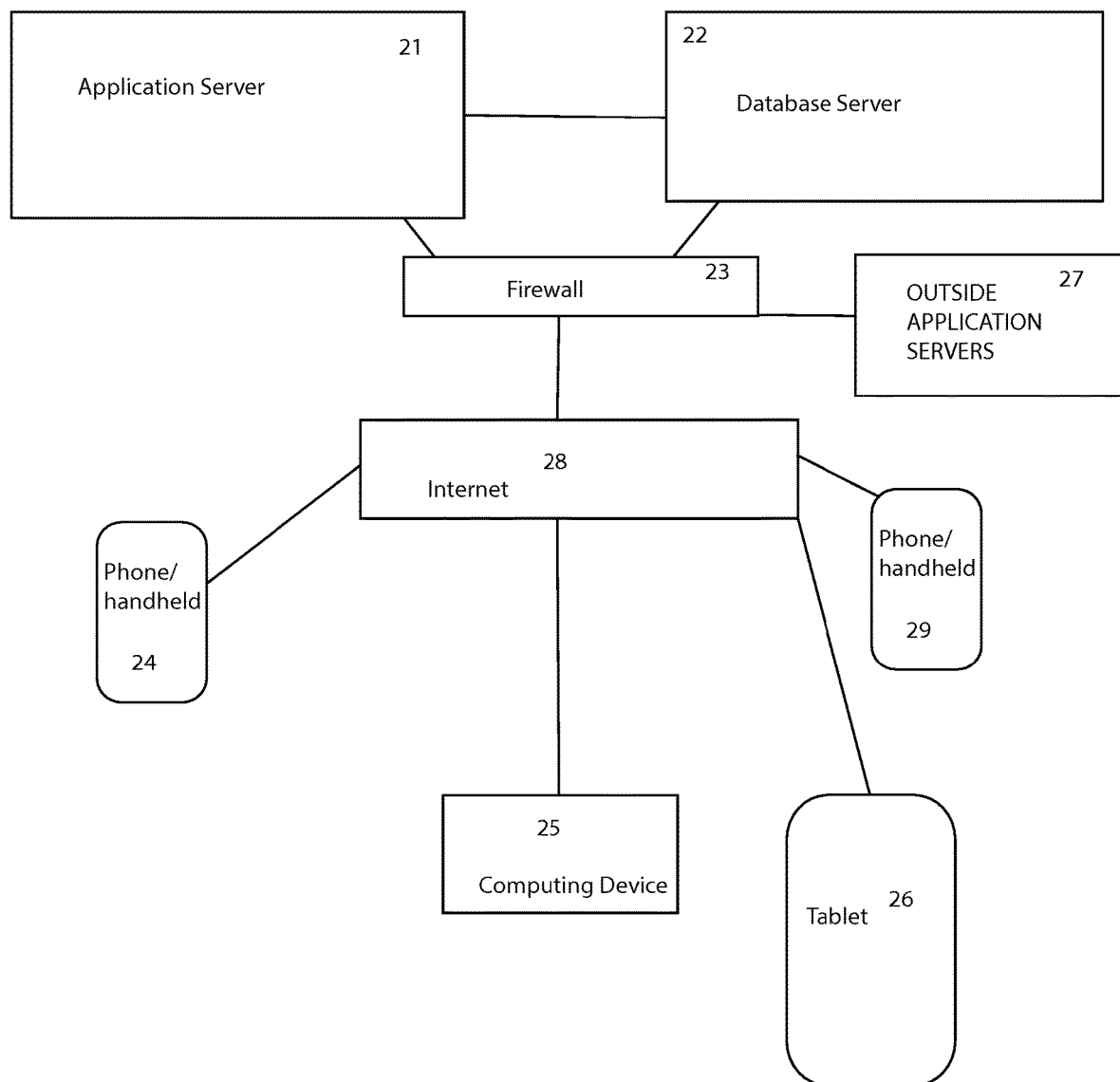
FIG. 1 is a schematic block diagram of a network associated with the process of any one of FIGS. 4A, 7A, 9-22.

FIG. 1 is the schematic block diagram of the computing systems that can be used with the programs or data systems shown in FIGS. 2A-2B, FIG. 3, FIG. 4B FIGS. 5 and 6 as well as with the processes shown in FIGS. 4A, 7A, 9-22. For example, there is an application server 21 which can be configured to coordinate a connection to an outside application such as application 446 or application 732 shown in FIGS. 4 and 7 respectively. Application server 21 is also configured to coordinate with any one of the computing devices 24, 25, 26 or 29 29 to run native application 45 to coordinate communication with database 301 and to also communicate with outside application servers 27 to run external application 46. There is also a database server which can be configured to house one or more of the databases shown in system database 301 in FIG. 3. The application server 21 and the database server 22 can be in the form of single servers or multiple servers each. These servers are coupled to or in communication with a firewall 23. This firewall is in communication with outside application servers 21 which are configured to run external application 446 (See FIG. 4B) or external application 732 in FIG. 7. Firewall 23 is coupled to or in communication with a communications network such as the internet 28. Coupled to or in communication with firewall 23 is internet 28. Coupled to internet 28 are a plurality of hand held devices 29, and 24, computing device 25 and tablet 26.

Figure 2A:
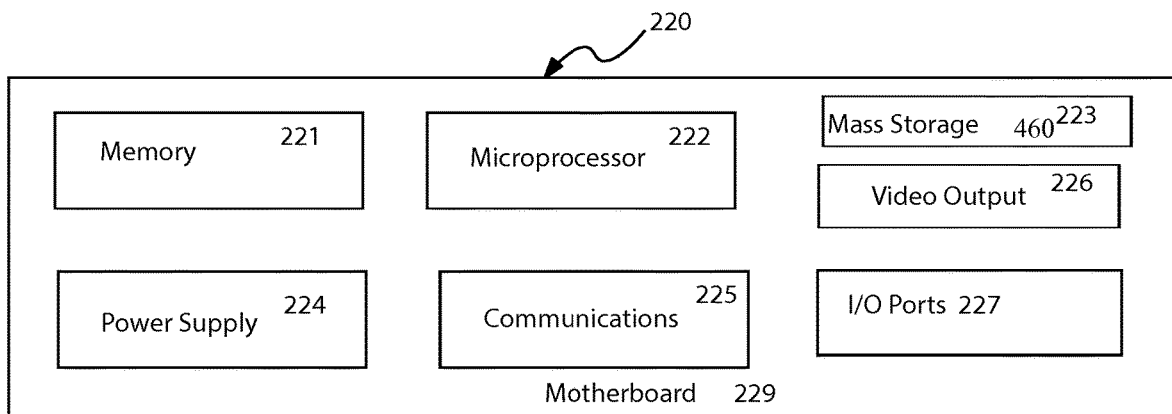
FIG. 2A is a schematic block diagram of the electronic components associated with the components shown in FIGS. 1, 2B, 3, 4B, 5, 6, and 7B.
Figure 2B:
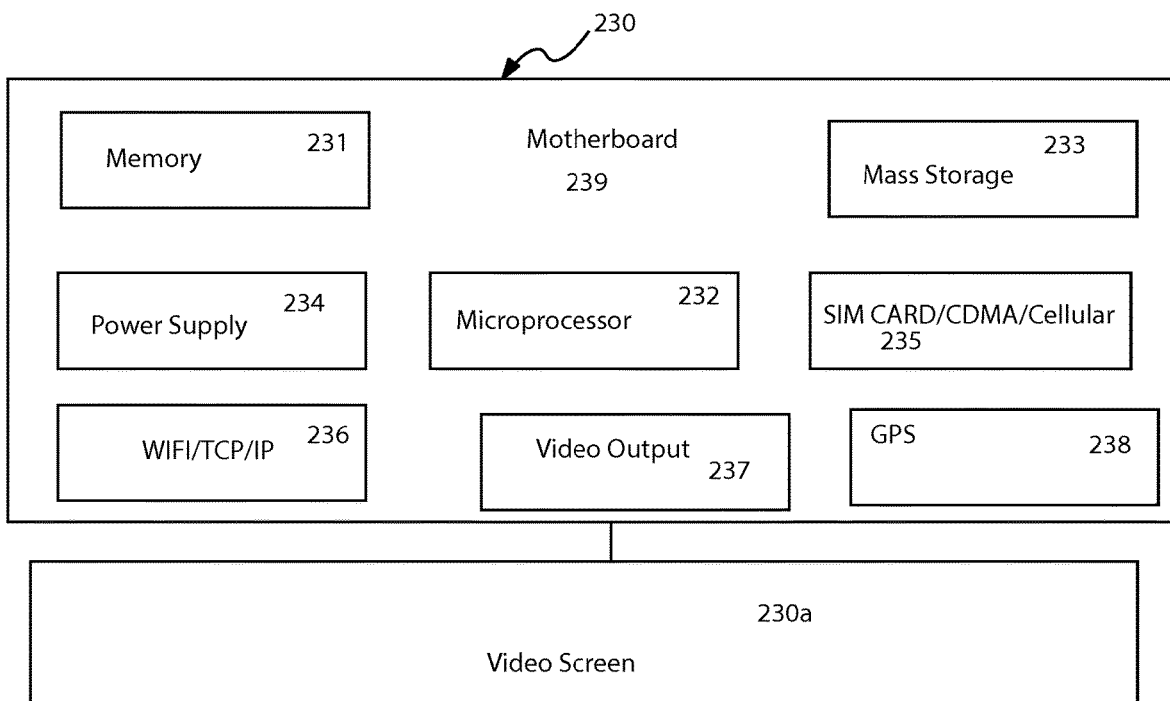
FIG. 2B is a schematic block diagram of the electronic components associated with the components shown in FIGS. 1, 2A, 3, 4B, 5, 6, and 7B.

FIG. 2A shows the schematic block diagram of electrical components for use with the non-mobile devices such as the application server 21, the database server 22, the outside application server 217, the computing device 25 etc. FIG. 2B is the schematic block diagram of the electrical components for use with the mobile devices such as the phone or handheld 210, phone or handheld 24, and the tablet 26. For example, FIG. 2B includes components 220 comprising a motherboard 229.

Coupled to the motherboard is a memory 221, microprocessor 222, mass storage 223, power supply 224, communications port 225, and video output 226. Motherboard 229 can be a standard motherboard which allows these components to be coupled together both electrically and communicatively. Memory 221 can be in the form of a solid state RAM memory that is used to house the program according to the system, wherein the instructions relating to the series of steps performed in FIGS. 1 A, 1 C, 2, 3, 4, 5, and 6 are stored at least in a temporary manner. Microprocessor 222, performs one or more of the steps associated with the series of steps listed in FIGS. 4A, 7A, and 9-22. Essentially, the term "system" comprises at least a microprocessor such as microprocessor 222 performing a series of instructions loaded from a memory 221 or mass storage 223 to perform a series of tasks outlined in the steps shown in FIGS. 4A, 7A and 9-22.

Mass storage 223 stores the programming instructions relating to the system which includes the steps listed in FIGS. 1 A, 1 C, 2, 3, 4, 5, and 6. Mass storage can be in the form of a ROM, which can comprise a hard drive. Power supply 224 provides power to the components coupled to motherboard 229. Power supply can be in the form of a standard type power supply which is coupled at one end to an outlet and at another end to a bus or electrical communication line on motherboard 229. Communications device 225 can be in the form of a receiver, a transmitter or transceiver such as an Ethernet port or Wi-Fi communicator which allows these electrical components to communicate to other components outside of a housing. For example, communications port 225 allows application server 21 to communicate with both database server 22 and with firewall 28. Video output 226 allows for video images to be shown on a screen if necessary. In addition 1/0 ports 227 can also allow for a user to input information into these servers directly such as through a keyboard or mouse or other input device rather than simply remotely.

FIG. 2B is a schematic block diagram showing the components of the elements associated with the portable device shown in FIG. 8. For example, this diagram of these components 230 includes a motherboard 239, memory 231, mass storage 233, power supply 234, microprocessor 232, a SIM Card 235, a WIFI/TCP/IP component 236, a video output 237, a GPS chip 238 and a video screen 230a. The motherboard, 239, memory 231, mass storage 233, power supply 234, microprocessor 232 and video output are all similar and function in a similar manner to the components described above and shown in FIG. 2A. SIM card 235 is also powered by the motherboard 239 and is also in communication with motherboard 239 and thus in communication with the other components. In addition WIFI/TCP/IP component 236 can be a wireless communication transceiver which communicates through a network connection such as a wireless connection with a network such as the internet 28. GPS chip 238 is in communication with motherboard 239 and is also powered by power supply 234 through motherboard 239. The output of video output 237 is thus to video screen 230a which allows the user to operate the application such as the internal or native application 45 which can be stored on the portable devices or operated on the components of the nonportable devices shown in FIG. 2A.

Figure 3:
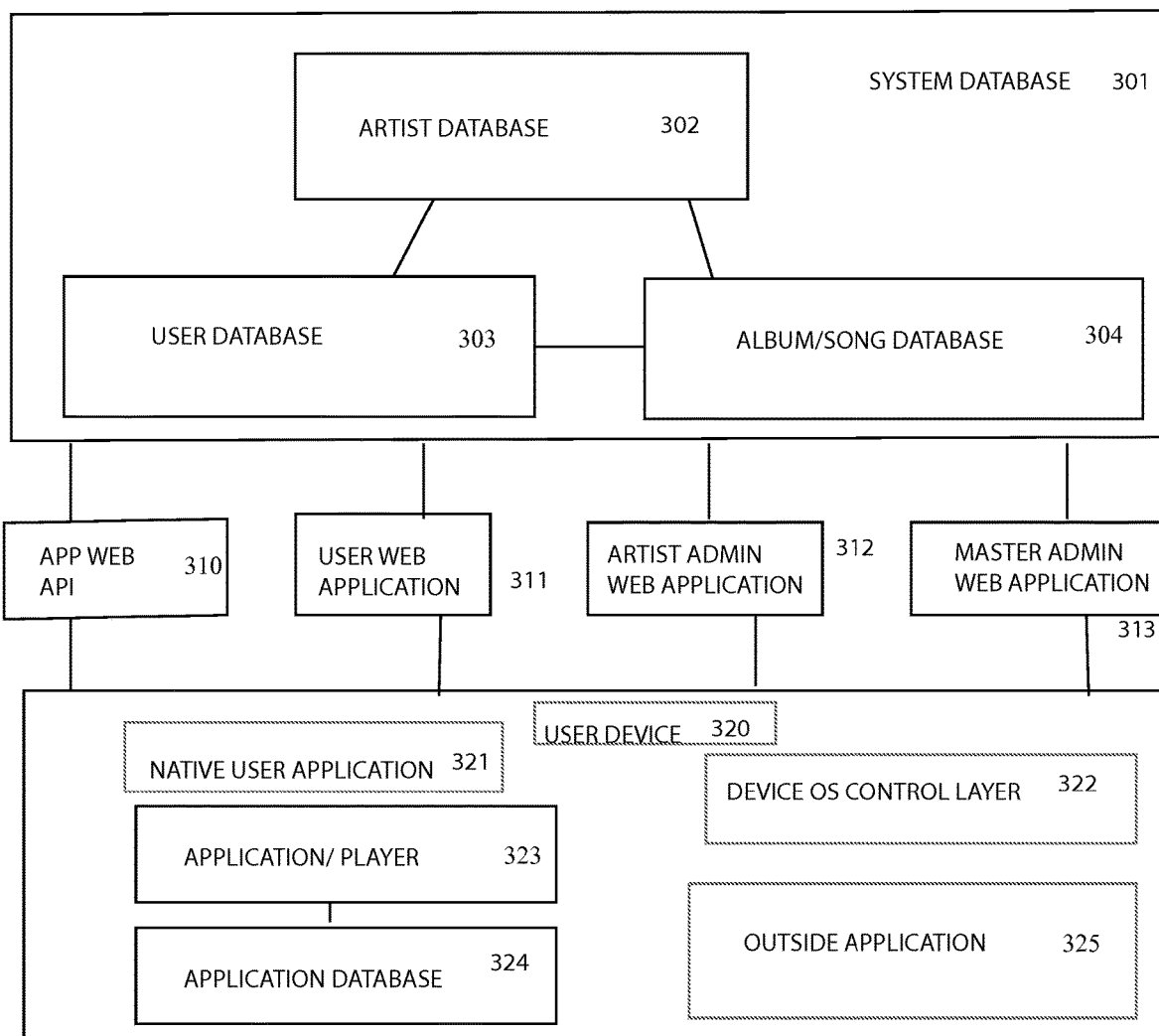
FIG. 3 is a block diagram of the components of the database and applications for use with the diagrams of FIGS. 1, 2A, and 2B.

For example, FIG. 3 shows a system database 301 which can be housed on database server 22, which includes an artist database 302, a user database 303 and an album or song database 304. Thus, the artist database 302 stores the identity and preferences of the artists/media owners set forth in the process shown in FIG. 4A. The user database stores the information provided by the user in the process shown in FIG. 4A, while the album and song database can store the information associated with the albums/songs, movies or other entertainment media units associated with artists or media owners in database 302. This information can be pulled from the databases 303 and 304 or from an external database as well.

Coupled to this system database are a plurality of API connections, and/or applications such as an application web API 310, a user web application 311, an artist admin web application 312, or a master admin web application 313. The user device 320 which can be in the form of a computing device such as a tablet, a smartphone or other type computing device that set form in FIG. 8 can connect to these databases through application web API 310.

This user device 320 can include a native user application 321 comprising an application player 323 and an application database 324. The device can also include a device OS control layer 322 and a connection to an outside application 325. This outside application can be in the form of an application such as outside application 446 shown in FIG. 4B and 732 shown in FIG. 7B.

Figure 4A:
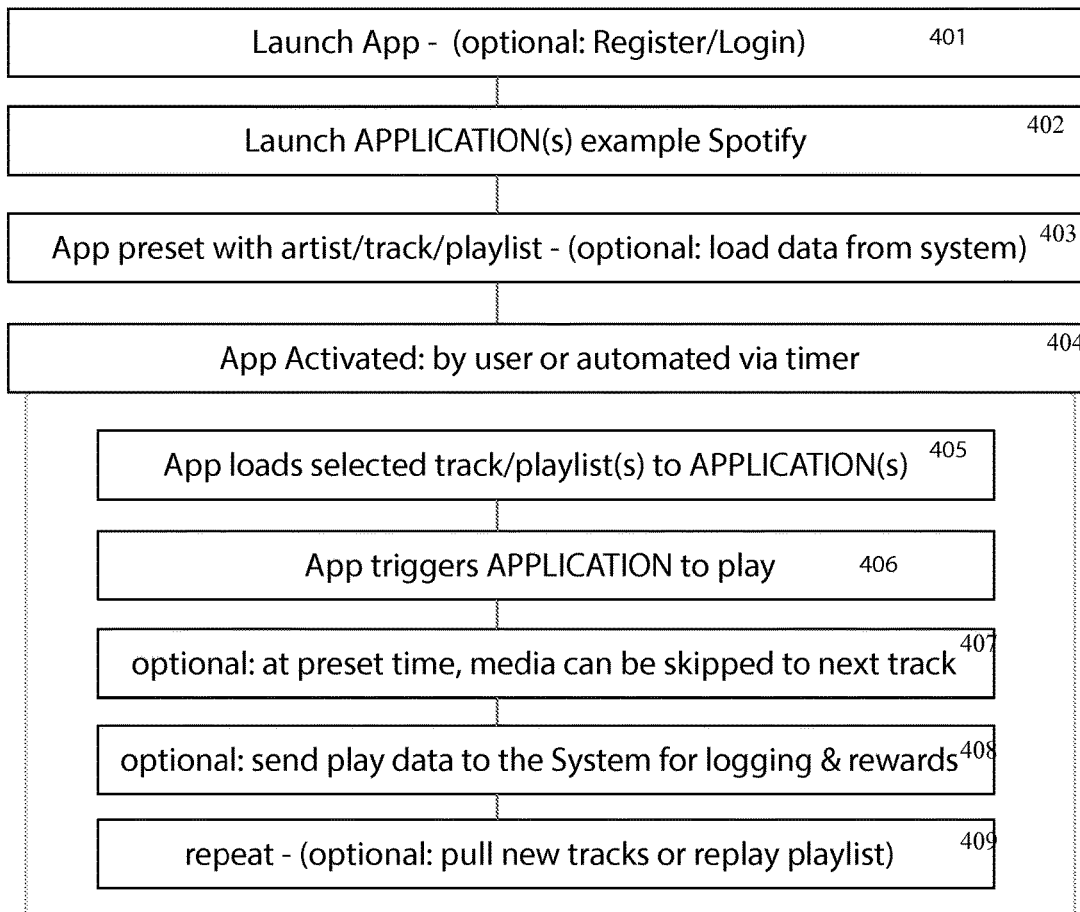
FIG. 4A is a flow chart for a first example process of one embodiment.

FIG. 4A is a flowchart of the process for controlling a media application on a computer or computerized device. For example, step 401 includes launching the application, wherein the user can register or login to the application. Next, step 402 the system would then launch an external application. The external application can be in the form of a media player such as a music player. Next, the first internal application or controlling application sends a playlist to the media application step 403. Next, in step 404 the media application is activated by starting a playlist via a timer. Once the timer has started, in step 405, the controlling or internal application loads the selected tracks or playlist to the media application. Thus, in step 406 the controlling application triggers the media application to play the media. Next, in an optional step 407 at a preset time, the media that is initially playing can be skipped to a next track or media selection. Next, in step 408, the controlling application and/or the media application can send played playlists or play data to the system for logging and recordation of rewards. Next, in step 409 the controlling application and the media application can repeat this process by going back to step 405 to pull tracks or to push a playlist. This process is configured so that a controlling or internal application which can be operated on a device such as that shown in FIG. 1 can control external media playing applications which can result in rewards being posted back to the user to benefit the user.

Figure 4B:
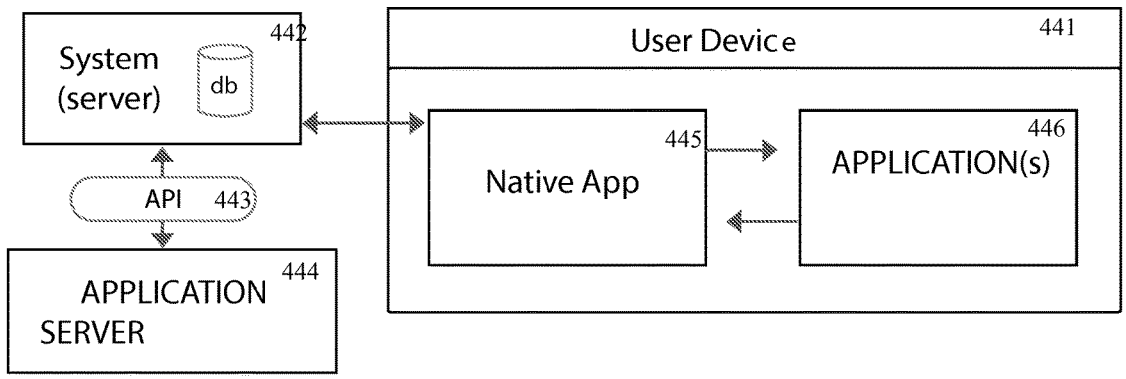
FIG. 4B is a schematic block diagram of the components that can be used for example with the process of FIG. 4A, or the process of FIG. 7A, 9-22.

FIG. 4B is a schematic block diagram of an a system for use with the process shown in FIG. 4A. For example, there is a system 440 which includes a user device 441 which is essentially microprocessor configured to control both internal or native application 445 as well as an external application 446. For example, the native or internal application 445 would be configured to pass along a playlist onto external application 446. This native application 445 is configured to communicate with the system server 442.

FIG. 4C is a flow chart for another embodiment of the invention. In this embodiment, there is a process for registering different parties such as users of entertainment property units, owners of entertainment property units, broadcasters, entertainment hosts, agents and any other type of suitable user. For example, in step 450 there is a step of registering a user. This registration is similar to that shown in FIG. 4A step 401. Next, in step 451, which is an optional step, other parties can register into the system as well. These any one of these other parties are as listed above such as broadcasters, entertainment hosts agents or any other suitable party or users. In step 452, an owner of entertainment property can also register into the system.

Essentially, when a user registers into the system, their associated information is recorded into a database such as that shown in step 456. This step can occur both before and after entertainment media or entertainment property units are loaded or uploaded into the system. Thus, in step 453, the entertainment property owner or his agent can upload entertainment property units such as music songs or other types of property units.

Next, in step 454 the user or consumer of the content can select to consume an entertainment property unit. Next, in step 456, as described above, the system can store information about the user, the owner, and the entertainment property in the database such as database 301. In addition, the playlist of the entertainment property units that were selected is exported to the database such as database 301 as well.

In step 460 the system such as application server 21 is configured to play or stream the entertainment property playlist so that it can be consumed by the registered user. Because the system can track the usage of these entertainment property units, and who is consuming them, via the records in the database such as database 301, the system can in step 462 automatically reward the user and/or the artist or any other registered party for the user of the entertainment property units such as music.

With respect to the flowchart of FIG. 4C, each of these steps can be optionally used with and inserted into any one of the other flowcharts such as the flowchart shown in FIG. 4A, or the following flow charts discussed below such as that shown in FIG. 7A, FIG. 9, FIG. 10, FIG. 11, FIG. 12, FIG. 13, FIG. 15, FIG. 16, FIG. 17, FIG. 18, FIG. 19, FIG. 20, FIG. 21, FIG. 22, FIG. 23B, FIG. 24, FIG. 25, FIG. 27, FIG. 29, FIG. 30A, FIG. 30B, FIG. 31.

Figure 5:
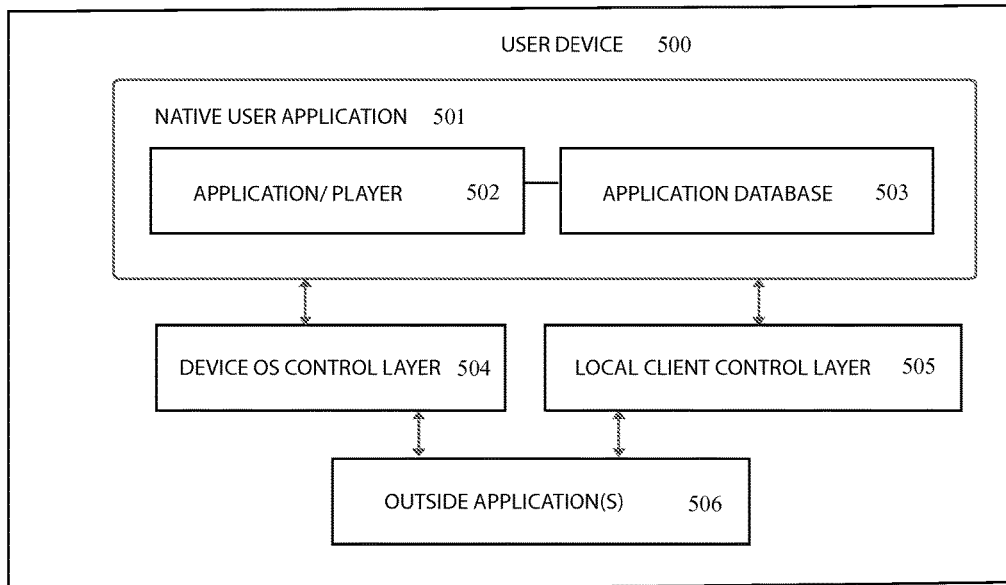
FIG. 5 is another example schematic block diagram of the different data components associated with any one of the systems outlined in FIGS. 1, 2A, 2B, 3, 6, 7B, 8B.

FIG. 5 is a schematic block diagram of an alternate user device configuration for use with the process shown in FIG. 7. This alternate embodiment of a user device 500 can include a native user application 501 comprising an application player 502 and an application database 503. The device can also include a device OS control layer 504 and/or a local API/client control layer 505, and connections to outside applications 506 through either control layer, or through both control layers. This outside application can be in the form of an application such as outside application 46 shown in FIGS. 1B and 1D.

Figure 6:
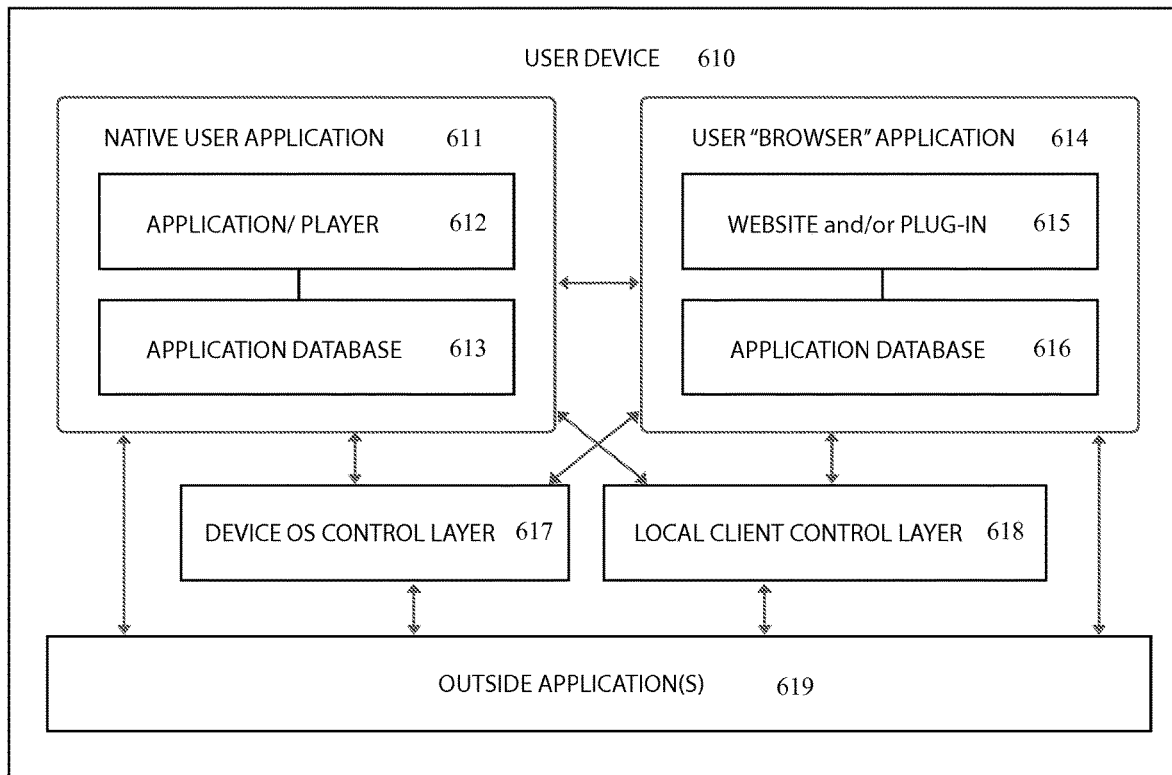
FIG. 6 is another example schematic block diagram of the different data components associated with any one of the systems outlined in FIGS. 1, 2A, 2B, 3, 5, 7B, 8B.
Figure 7A:
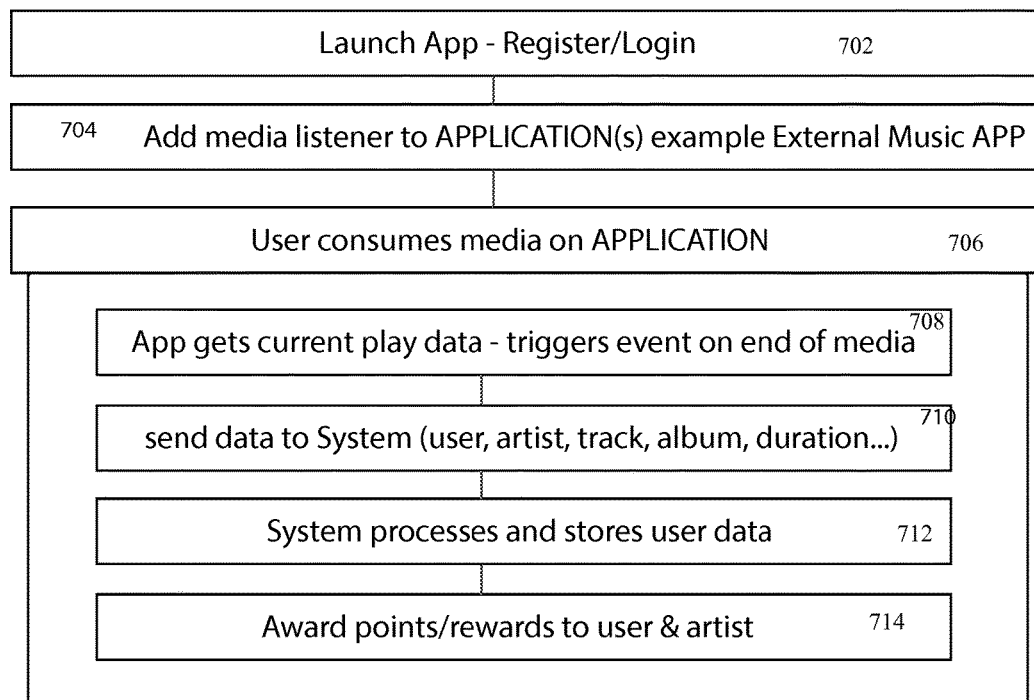
FIG. 7A is a flow chart of a second example process of one embodiment.

FIG. 6 is a schematic block diagram of an alternate user device configuration for use with the process shown in FIGS. 4A and 7A. This alternate embodiment of a user device 610 can include a native user application 611 comprising an application player 612 and an application database 613, and/or a system and/or native user 'browser' application 614 comprising a website, plugin, or extension 615, and an application database 616.

The device can also include a device OS control layer 604 and/or a local API/client control layer 605, and connections to outside applications 606 through either control layer, through both control layers, directly from the native user application 611 to the outside applications 619, or directly through the user browser application 614. The outside application can be in the form of an application such as outside application 446 shown in FIG. 4B and 732 in FIG. 7B.

FIG. 7A is a flowchart of the process for the basic listener mode application. For example, the process starts in step 702 includes launching the application after registration or log in. Next, in step 704 the user can add media to the application. The media units can be in the form of a song, a movie, a picture, or any other element that can be in the form of a media unit. In addition, the user can connect to an outsider external application such as application 446 shown in FIG. 4A. Next, the process proceeds to step 708 where the user can consume media on this external application 732. In this case, as shown in step 708, the native user application 725 continually obtains current play data (via the media listener 726) and triggers an event on the end of a play of the media. This event could be in the form of transferring to play another media unit.

Additionally after the trigger, in step 710, the native user application 725 sends this complete play data to the system server 722, which then records the songs that have been played and other associated data such as Artist, Album, media duration and play duration. Next, in step 712 the system processes and stores the user data in the system server 722. The system server 722 stores the information relating to the media/tracks that have been played, the points to be earned, the bonuses to be paid, and other data relating to both the artist and the user. Next, in step 714 the system awards points and rewards the user and the artist. For example, if the artist had agreed to forward one third (33%) of the payouts on to the user/listener then under this formula, once the song is played past a determined threshold, the user is credited with points and bonuses extending from the artist's contract with the external application. In this way, users are incentivized to play the artist tracks/consume artist's media.

FIG. 8A is a schematic block diagram of an alternate system configuration for use with the process shown in FIG. 1A. For example, there is a system 800 which includes a user device 801 which is essentially microprocessor configured to control both an internal or native browser application and/or application plugin 805 as well as an external application 806. This plugin application acts as a plugin to a browser wherein the plugin to the browser adds functionality to the browser so that when a user opens the browser the native or internal browser application and/or plugin 805 would be configured to automatically pass along a playlist onto external application 806. This native browser application 805 is configured to communicate with the system server 802. In this alternate system configuration, the native application described in FIG. 4B can be substituted by, or used in conjunction with the native browser application and/or plugin 805 to communicate with the external application 806 and the system server 802.

Figure 7B:
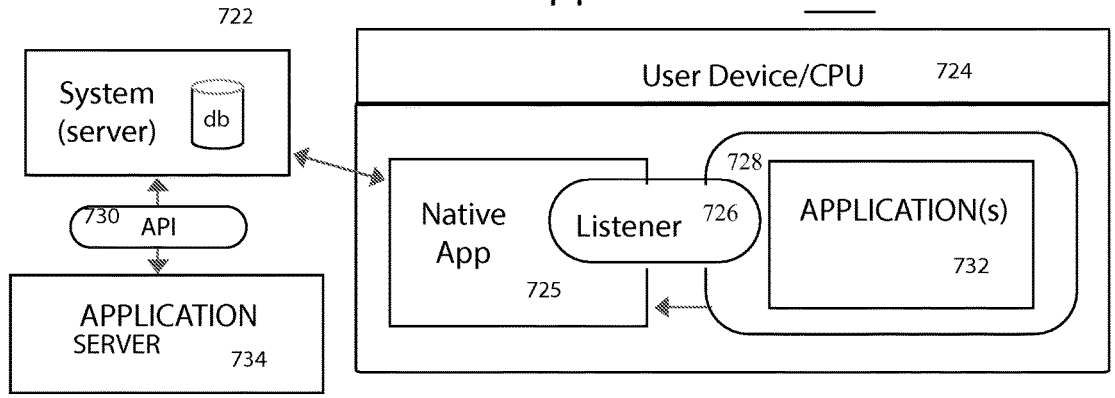
FIG. 7B is a schematic block diagram of the components that can be used for example with the process of FIG. 7A or the process of FIG. 4A, 7A, or 9-22.

FIG. 8B is a schematic block diagram of an alternate system configuration for use with the basic listener mode application process shown in FIG. 1-2B or the basic auto mode application process shown in FIG. 4A (FIG. 7B can also be used with FIGS. 4A & 7A). In this alternate system configuration 808 the native application 445 described in FIG. 4B can be substituted by, or used in conjunction with the native browser application and/or plugin 805 to communicate with the external application 806 and the system server 802. The native browser application 805 and/or plugin can add a media listener 807 to continually obtain current play data and trigger a variety of events, on the end of a play of the media and/or other events. The media listener 807 can also be used in another non-limiting embodiment to detect deviations from defined tracklists that are preset to play as a playlist/series of tracks, or other deviations from other expected behaviors, such as in auto-play mode 920 in FIG. 9, playlist mode 1754 (See FIG. 17, or single tracks mode 1765 (FIG. 17), and album mode 1910 in FIG. 19.

Figure 9:
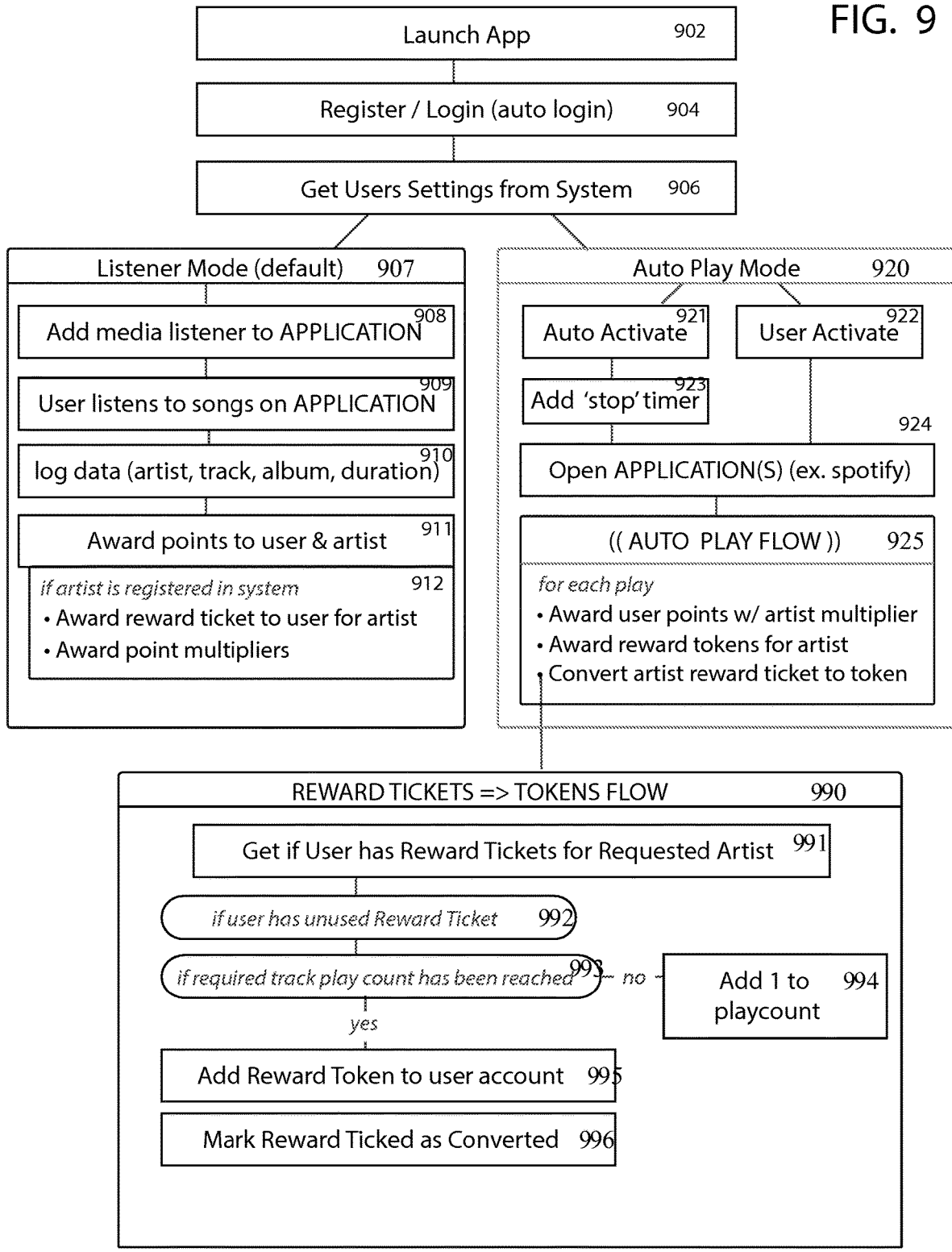
FIG. 9 is a flow chart of another example process of one embodiment.

FIG. 9 is a more detailed version or embodiment than that as shown in FIGS. 4A-4B and 7A-7B. For example, the process can start in step 902, where the user launches the application. Next, in step 904, the user can register or login to the system. Next, in step 906 the system can obtain the user settings such as artist preferences and application preferences (as described in FIG. 15, steps 1524-1536). These user settings can be in the form of listening playlists, listening preferences, and other profiles relating to a particular user. For example, the process can proceed to step 907 where the system initiates a listener mode. With a listener mode, the user can listen to media with external applications and the native user app, scans what media is being consumed, and then reward the user. Alternately the user can select/add media to play in step 908. In this case the native app would make a call through the OS to select and play the selected media. Once the user has activated the native user app (and optionally has added media via the native app or user website), in step 909, the user can listen to songs/media on the external application. If the user selected media via the native app then the native app sends track selections to the external app. Alternatively, if the user is using the external app to play their music then the native app just listens to what is playing and does not send control commands.

At this point, the system can log the data relating to the artists, the track, the album, the duration of the song, and the play duration in step 910. Next, the system can award points to the user and the artist in step 911. In addition, in step 912, the system can award a ticket to the user for that artist, and/or award point multipliers to the users based on system/artist bonus settings. In this way, the system can generate sufficient amount of activity or a particular amount of activity for artists in the playlist by offering bonuses to the users. Alternatively, the system can proceed to step 920 which includes an auto-play mode with an optional auto muting setting. With step 920, the system can then proceed to step 921 wherein the system auto activates a series of songs or media units in the playlist. Alternatively, in step 922, the user can manually activate the auto-play mode. If the system is auto activated in step 921, in step 923, the system can add an auto stop timer. The stop timer is essentially a timer which stops the auto playing of media on external application at a set time or after preset period of time. Next, the application can then open external applications such as external application 446, 732 and step 924. Next, in step 925 the system can auto play wherein the system awards users points with the system/artist multipliers, bonuses, rewards tokens for the artist, and potentially converts a previously earned artist reward ticket to a token.

In step 990, the system can determine if the user has pending reward tickets for the artist whose media is being consumed, and control whether to convert tickets to tokens. Step 990 includes a plurality of different sub-steps. For example, the system can proceed to step 991 where the system obtains if user has an unconverted reward ticket for a requested artist. For example, in step 992 the system can determine if the user has an unconverted reward ticket. If the user has an unconverted ticket the system could check if the user has played the amount of plays required by the system to be converted into a token. Conversion of a ticket to a token would occur if the required number or count of media units/tracks played has been reached in step 993. Alternatively, if the play count has not been reached, the system would add or increment one additional occurrence of media unit/track playing to the play count. This process would continue until in step 993, the system determines that the predetermined media play count has been reached. If the count has not been reached then the system in step 994 adds a score of 1 to the play count, and returns to step 990. Alternatively, if the count has been reached, the system would proceed to step 995 where it would add a reward token to the user's account. Next, it would mark that the reward ticket is converted to a token in step 996. Essentially, tickets refer to the potential awards, Tokens are the converted Tickets which have actual 'value' for rewards.

Figure 10:
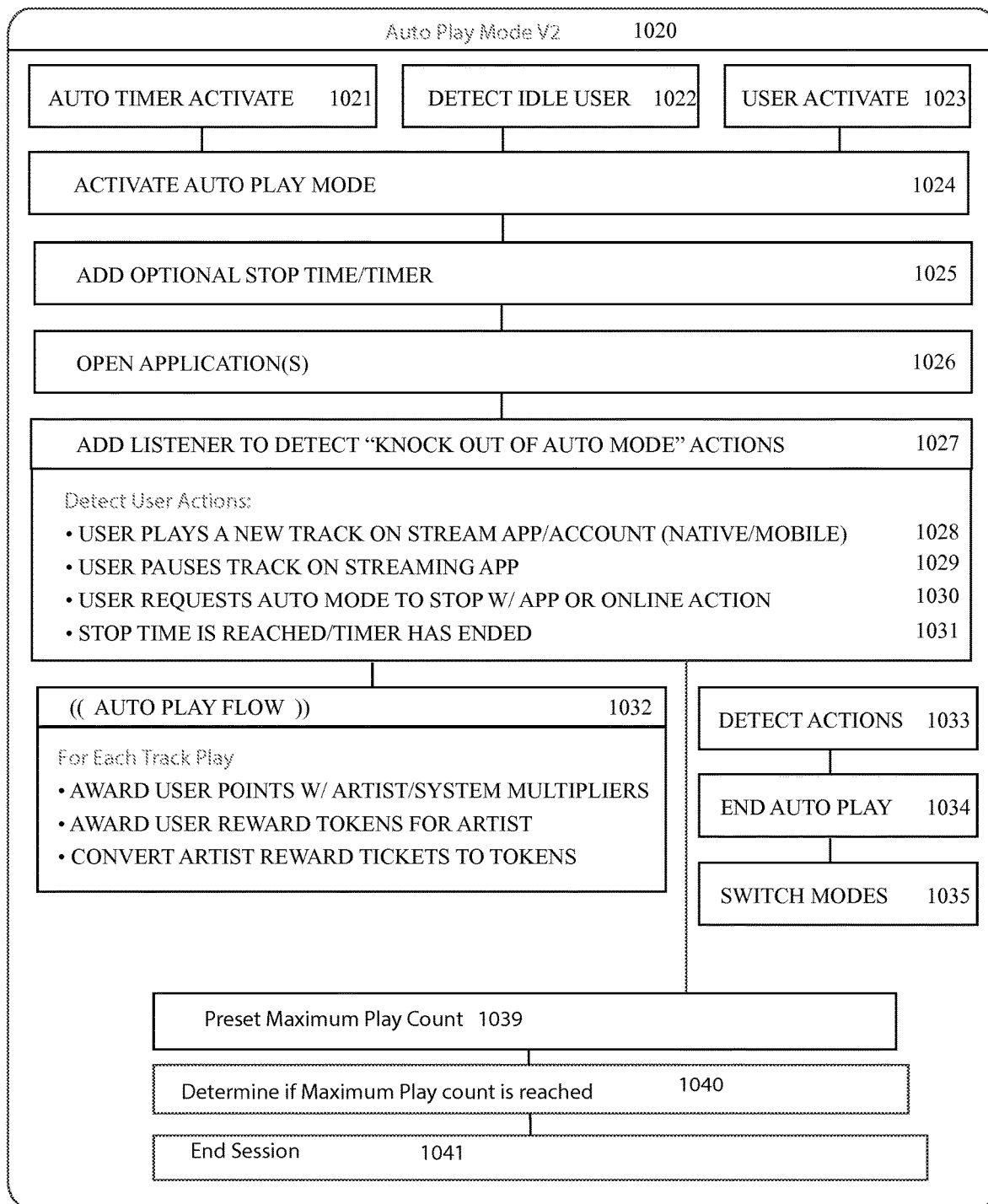
FIG. 10 is a flow chart of another example process of one embodiment.

FIG. 10 is an alternate version or embodiment of Auto Play Mode 1020 in FIG. 9. The second version of Auto Play Mode 1020 includes an auto play mode with an optional auto muting setting. When the system proceeds to auto play mode in step 1020, the system can then proceed to step 1021 where the system detects the current time is within a user's set time to automatically activate Auto Play Mode. If the user is in range the system auto activates 1024 a series of songs or media units in the playlist. Alternatively, in step 1022, the system can detect how long a user has been idle (across all devices logged into the same account). The system can determine if auto play mode should be activated for the user and activate auto play mode 1024 if necessary.

Alternatively, in step 1023, the user can manually activate the auto play mode activation 1024. If the system is auto activated in step 1024, the system can add an optional auto play mode stop timer 1025 based on the user/system preferences. If the auto play mode stop time/timer 1025 is set, the system detects if the user is out of range and stops auto play mode if it is out of range. The stop timer is essentially a timer which stops the auto playing of media on external application at a set time or after preset period of time. Next, the application can then open external applications such as external application 446 or 732, and step 924 or 1026.

Next, in step 1027 the system can add listeners to detect actions/events 1033 that can trigger other actions, such as Ending Auto Play Mode 1034 and Switching to Listener Mode 1035. These actions can be detected from the same device or a device linked to the same account. The following are non-limiting example actions that can be used to detect that auto play mode should be ended. Auto play can be ended if a User plays a track/adjusts the play head 1028 on a streaming application 806 and/or linked account. Auto play can also be ended if a user pauses a track 1029 on a streaming application 806. Auto play can also be ended if a user requests auto play mode to end 1030 via an application or online action 445, 805, 806, 807. Additionally, auto play can be ended if a stop time is reached or if a timer has ended 1031.

Next, in step 1032 the system can auto play wherein the system awards users points and rewards tokens for the artist, with optional system/artist multipliers and bonuses applied, and potentially converts a previously earned artist reward tickets to tokens.

Alternatively the system can be set so that it can have a preset maximum play count. For example, in step 1039 the user or the system can preset the maximum number of rounds, or cycles in a single session to set a maximum play count. The system can determine the maximum rounds based on the user's total play history, the user's recent play history, all user's play history, total users of connected systems, value put into the systems by the user and/or all users, and value taken out of the systems by the user and/or all users. In this way, if the maximum play count is reached, in step 1040 with the system determining via a counter the number of songs played for a particular user, then the system can proceed to step 1041 to end the session. In this way a single user cannot use most if not all of the resources of the system for their benefit.

Figure 11:
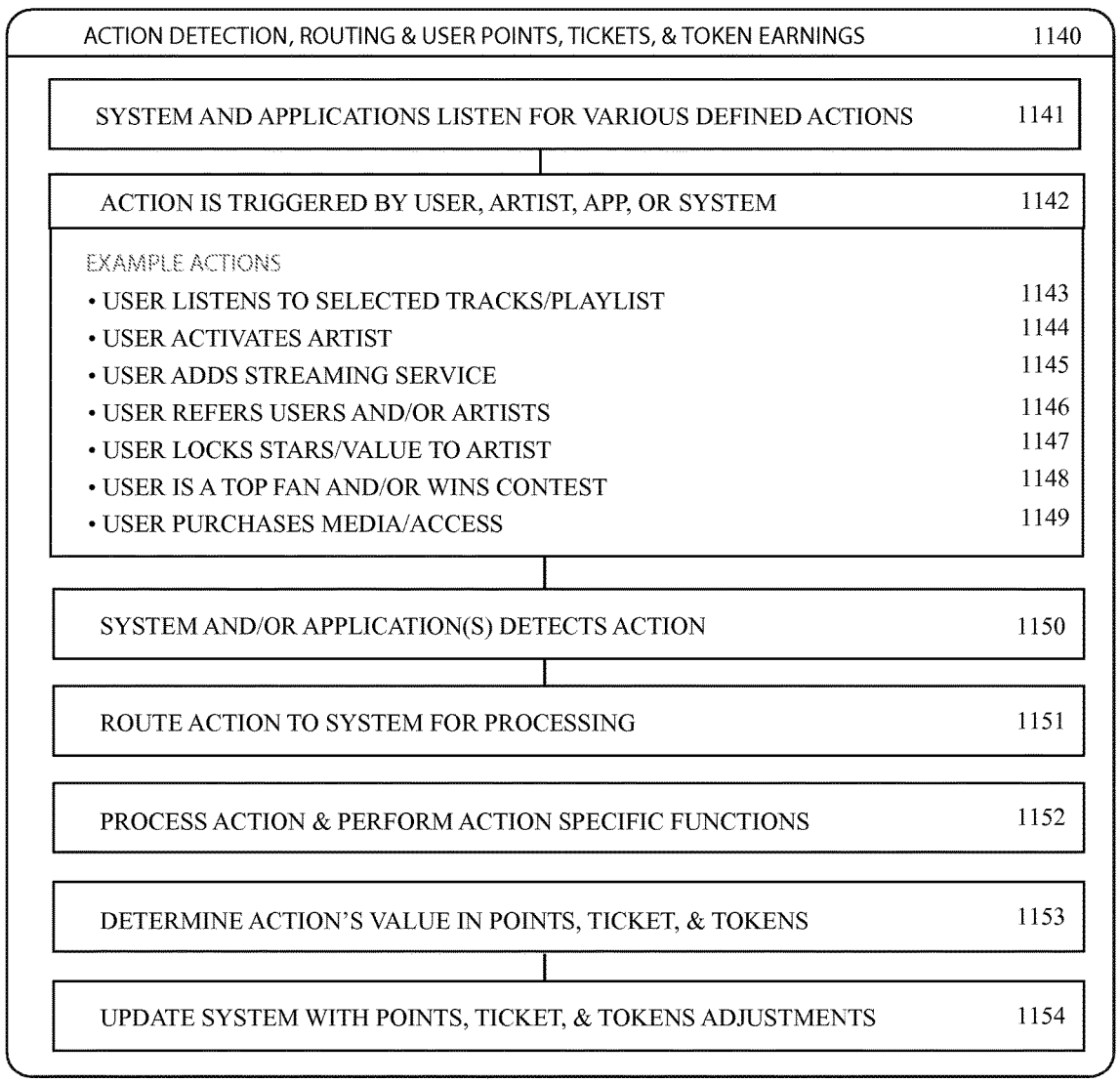
FIG. 11 is a flow chart of another example process of one embodiment.

FIG. 11 is a flowchart of the process for basic action detection, routing, and rewarding users/artists. FIG. 11 is a more detailed version or embodiment of processing actions/events than that as shown in the step of auto play flow 1032 in FIG. 10 and playlist mode 1754 in FIG. 17 as well as the modes shown in the step of sending play data to the system for logging and rewards in FIG. 4A. Alternatively the step of awarding points to the user or artist in step 56 in FIG. 7A, or the step of logging data of the artist, track, album or duration, or the steps of awarding points to the user or artist or performing the auto play flow 920 in FIG. 9, step 1209 in FIG. 12, and steps 1534, 1535, 1536, in FIG. 15.

With step 1140, the system can then proceed to step 1141 wherein the system and application are set to listen and respond to various defined actions. Actions can be triggered when conditions are met/detected and/or initiated by the system, users, artists, and/or applications 1142. The following are non-limiting example actions that can be used for further processing and/or event triggering. A user listens to selected tracks and/or playlists 1143, a user activates/follows/becomes a fan of an artist 1144, a user adds a streaming service to the system 1145, a user refers other users and/or artists 1146, a user locks stars/value to an artist 1147, a user is a 'top fan' of artist/in the system and/or wins a contest 1148, or if a user purchases media or access via a direct or indirect payment channel 1149.

In step 1150, the system and/or applications detect an action, and then routes the action/data to the system for processing 1151. Next, the system processes the action and performs action specific functions 1152. Next, in step 1153 the system determines the action's value in points, tickets, tokens. In step 1154 the system is updated with the points, tickets, and tokens adjustments.

Figure 12:
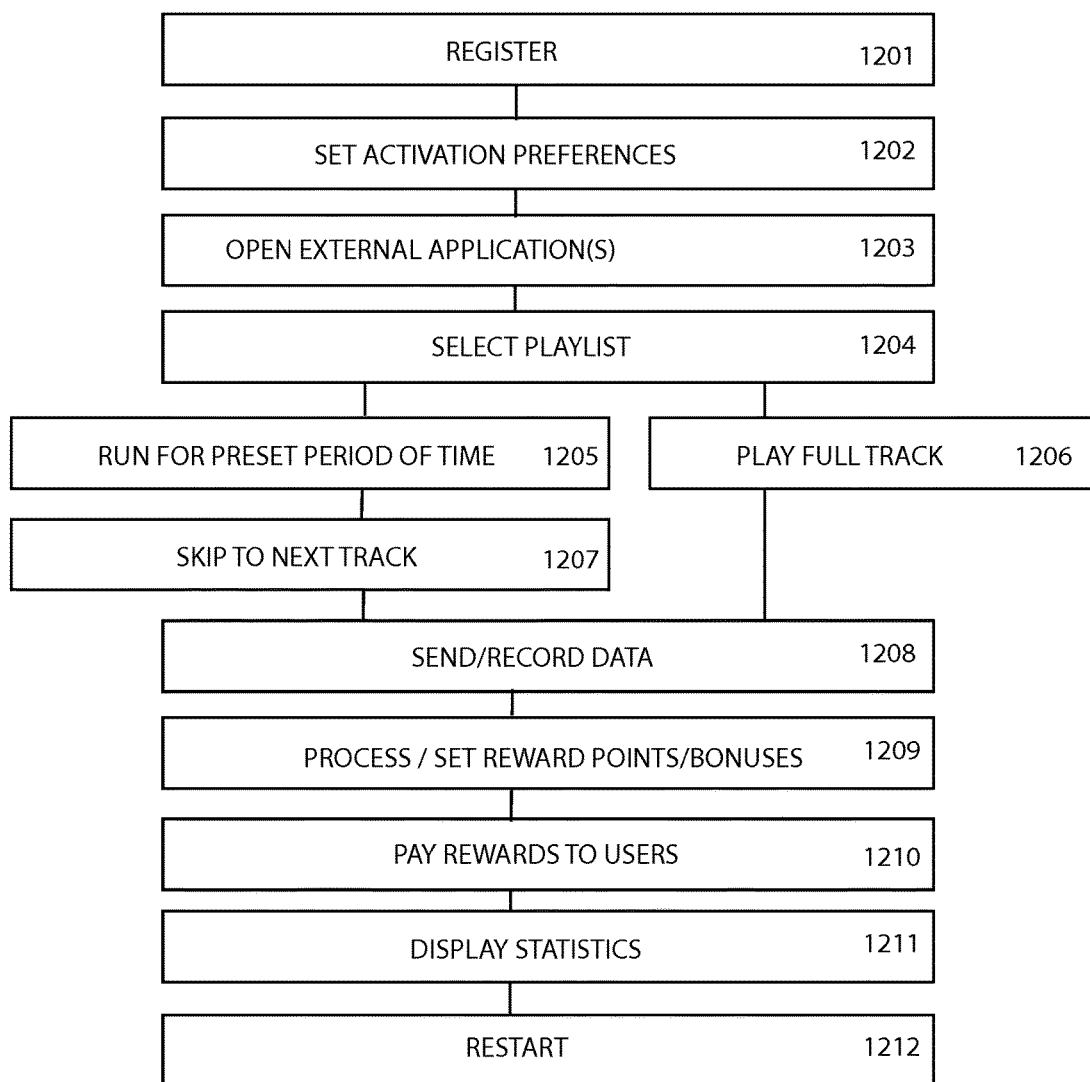
FIG. 12 is a flow chart of another example process of one embodiment.

In FIG. 12, the step series shows a flow chart of the auto play mode. For example, with FIG. 12 there is a another flowchart showing another embodiment of the invention which results in an auto play mode which results in the automatic playing of media data units via an external application. If the user has potential rewards (tickets), which are earned from listening to registered artists during listener mode, they would be converted by playing media units by the artist in this auto mode. For example, this process starts in step 1201 where user registers to the system. Next in step 1202, the user optionally sets his activation preferences. These activation preferences can be in the form of settings such as different types of media units, different playlists, different start times, play duration, or any other playlist preference. Next, in step 1203 the system opens or activates an external application. This external application can be in the form of a media player such as external application 446 or 732 shown in FIG. 4 or FIG. 7 which plays any of the assorted media such as music, movies, pictures or any other known media. Next, the system selects a playlist in step 1204 based on user activation settings set in 1202 and following the FIG. 17 flow or process. The playlist for example can be a list of songs to be listened to by the user. Alternatively, this list can be in the form of audio clips, video clips, movies, pictures, or any other media units selected by the user. Next in step 1205 the system runs these media units individually for preset period of time. Alternatively, in step 1206, the system plays the full track of music or media unit.

Next, if the system only runs the media unit for a preset period of time, the system can then in step 1207, skip to the next track. Next, in step 1208 the native user app sends the necessary data to the system through the App Web API (310 (FIG. 3)). This data can be in the form of a record of the media that is played with the external application along with the system data such as the data initially sent with the playlist. Next, in step 1209, the system processes and sets the rewards points/bonuses for the users. Next in step 1210, the system pays these rewards to the users and flags them as paid. This payment can be in the form of a monetary transfer, digital downloads, merchandise, tickets to a show, or any other suitable means to pay rewards to a user. Next, in step 1211 the system can display statistics relating to the data which represents the media units that have been played. These statistics can be in the form of the number of media units played, the duration that each media unit is played, the artist associated with each media unit, the reward associated with the media unit, bonus points associated with the playing of any individual media unit or any bundled media unit, or any other suitable statistics. The data can be presented in formats useful for the viewer depending if they are a user, artist, or system admin using one of the various interfaces into the system, such as the User Web Application 311, User Device Application 320, Artist Admin Web Application 312, or Master Admin Web Application 313. Next, in step 1212 system can restart back to step 1204 where the system selects additional media for the playlist.

Figure 13:
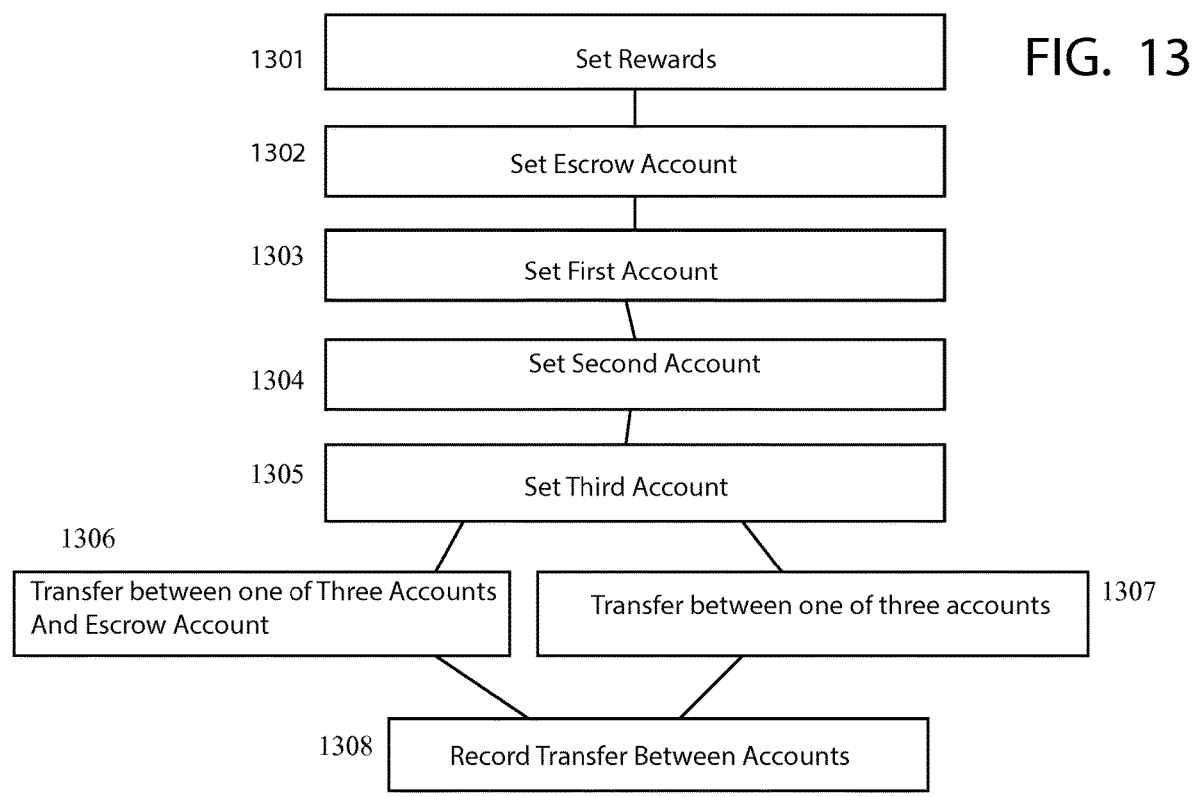
FIG. 13 is a flow chart showing another example of the process for transferring funds or rewards between accounts.

FIG. 13 is a flow chart for the process for setting and distributing rewards to users and to artists. This system can be used to supply users or artist with rewards. This process can run using the system outlined in FIGS. 1 and 2A and 2B as well as in FIGS. 3A and 3B operating using multiple different simultaneous but concurrent internet sessions. For example, in step 1301 the process starts wherein the process sets rewards for the user/artist. This process begins wherein an artist can select the type of rewards that the user/listener would receive provided the user listens to the artists song. For example, if the artist could set up that the rewards are automatically forwarded in the form of points to a user's account. Those points can be then redeemed for merchandise, backstage passes, concert tickets, t-shirts, hats, memorabilia, events, or money. Alternatively the rewards could be simply money as well.

Figure 14:
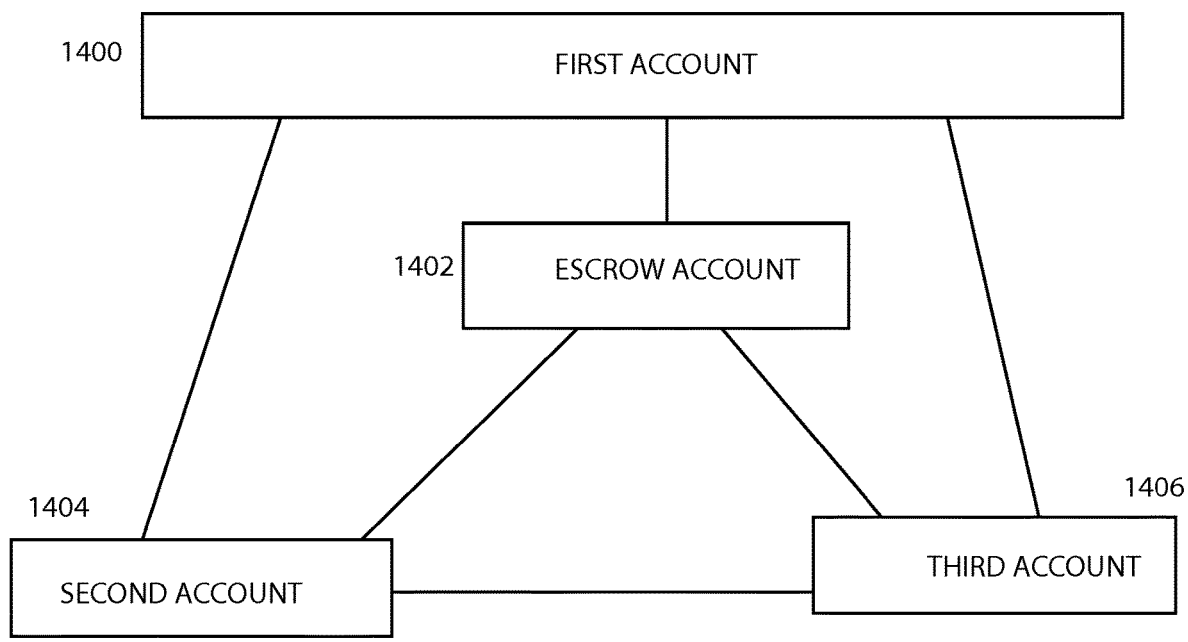
FIG. 14 is a block diagram showing another example of the transfer of funds between accounts.

Next, in step 1302 the user could set the escrow account such as the escrow account 1402 shown in FIG. 14. These rewards could then automatically flow into the escrow account based upon the formula determined for the rewards. Next, in step 1303, the user/system can set the first account. The first account can be in the form of the art provider's account, the user's account, or the artists' account. Next, in step 1304 the user/system can set the second account 1404 (See FIG. 14). The second account can be any one of the art provider's account, the users' account or the artists' account. Next, in step 1305 the system/user can set the third account, (1406 (See FIG. 14) so that this third account can be any one of the art provider's account, the user's account or the artist's account. Thus, at least one of the three accounts shown in FIG. 14 is for the art provider, one of the three accounts is for the artist and one of the three accounts is for the user. Each of the art provider, the artist, and the user can select whether to have the points held in escrow before final release. For example, once a song is played for a sufficient period of time, the art provider would then register that the song was played. Then the system could automatically request funds from the art provider. Those funds could then be automatically deposited into the artist's account. Once the user has either received enough points for redemption or once the user requests redemption, the system could then automatically transfer points, money or merchandise as listed above to the user's account. This is shown in step 1307 which shows the step for transferring among the three accounts.

Alternatively the money/rewards could be transferred to an escrow account such as escrow account 1402 in step 1306. Next, in step 1308 the system could record the transfer of these funds/merchandise in a database such as database 301 in database server 22.

FIG. 14 is a block diagram of the layout of the accounts which may be involved in transferring money/merchandise between the three parties. These accounts include a first account 1400, an escrow account 1402, a second account 1404, and a third account 1406. Essentially money can be transferred between these accounts such as between the first account 1400, and the escrow account 1402. Money can also be transferred between the escrow account 1402 and the second account 1404. Money can also be transferred between the escrow account 1402 and the third account 1406. Money can also be transferred between the first account 1400 and the third account 1406 directly, between the first account 1400 and the second account 1404 directly and between the second account 1404 and the third account 1406 directly.

Figure 15:
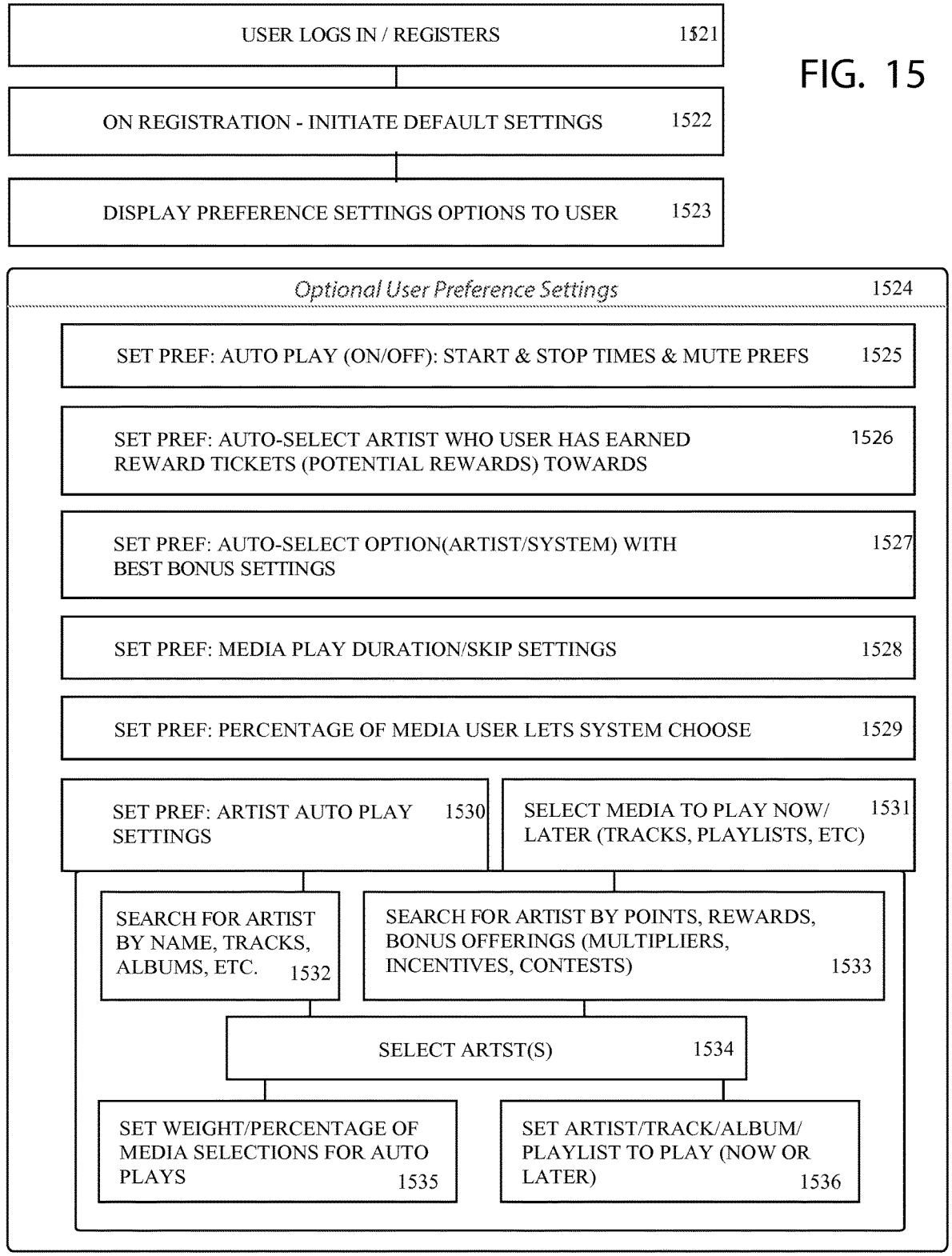
FIG. 15 is a flow chart for registering a user with the system.

FIG. 15 is a flowchart for indicating how user registers to the system. FIG. 15 shows a flowchart that is simply an expansion of the means for registering as shown in steps 401, 702, 904, and 1201. Next, on registration the system initiates default settings. These default settings can be settings for duration of play, artists associated with media units, auto start/stop times, or any other system settings. Next, in step 1523 the user can select and then display his preference settings which include editable options for the user. These preference settings can include artists, types of media unit, duration of media unit, or any other preferences for selecting or using media units such as the preference options in step 1524.

Step 1524 includes a series of optional user preference settings. In this step, there are a series of associated steps such as step 1525, which includes setting preferences for auto-play, including setting a start and stop time for the system. For example, the user can select the times at which the system opens/activates the external application and automatically plays media units. For example, the system can select to start playing these media units at for example 11:00 PM and stop playing at 8:30 AM. Alternatively, the user could select to start playing the media units at midnight, 1:00 AM, 2:00 AM, 3:30 AM, or any other suitable time selected by the user.

Next, in step 1526 the user is able to have the system auto-select or select an artist who the user has earned reward tickets that have not been converted. These tickets were earned by the user by consuming artist's media during listener mode 907.

Next, in step 1527, the user could select, or let the system select, a particular artist, that is associated with particular rewards. These types of rewards could be, for example, bonus awards which pay out extra normal bonuses to the enrolled users. For example, the user could select the artist with the best bonus system, or in the same step, the system could select this artist for him or her. In some cases letting the system choose media in step 1529 for the user will result in the best rewards. In this case the system selected media unit will be chosen when a media unit is requested. Next, in step 1528 the user could select, or the system could select the media play duration for the media units. This duration could be for example 25 seconds, one minute and 33 seconds, 30 seconds, or any suitable range for playtime that will result in the artist getting paid royalties from the external application. Once the duration for play is met the system skips to a following media unit in a playlist, or if the full track is played the next track in the playlist is played.

Next, in step 1529, the user or the system can set the percentage of media units selected by the system. The System will chose the media to auto play for the user, and in return reward them with a point/bonus multiplier/other bonuses. For example, the user can let the system select their auto play media 33% of the time. Alternatively, this could be one quarter of the time or 5%, or 50%.

Next, in step 1530, the user can use the following steps 1532-1534-1535 to set the auto play settings for the media. Alternatively, in step 1531 the user could select the order for the media playlist to listen to in listener mode 907 or for use in auto play mode 920. Next, the system would proceed to step 1532 where the user of the system could search for artists/media by name, tracks, albums, etc. This search could search both the system and pull data from outside application APIs. Alternatively, in step 1533, the user could search for artists offering points, rewards, bonus offerings, including multipliers, incentives, and contests.

Next, in step 1534, either the user or the system could select the artists associated with requested media search results who the user wants media to be selected from during listener mode 907 or auto play mode 920. Next, in step 1535 the system or the user can set the weight or percentage of the media selections for auto plays. Alternatively, in step 1536 the system or user could set the artist track album or other type playlist for media units to play either now or at a later period of time with listener mode 907 or auto play mode 920.

Thus, with these preset and adjustable settings, the user who registers with the system would be able to edit his default settings, and then ultimately eventually receive rewards for listening to and for using auto play mode with this type of music or other media units. Therefore, with this type system, the user could maximize his rewards for listening to particular types of music based upon the rewards granted by an artist, they system, and/or by external applications.

Figure 16:
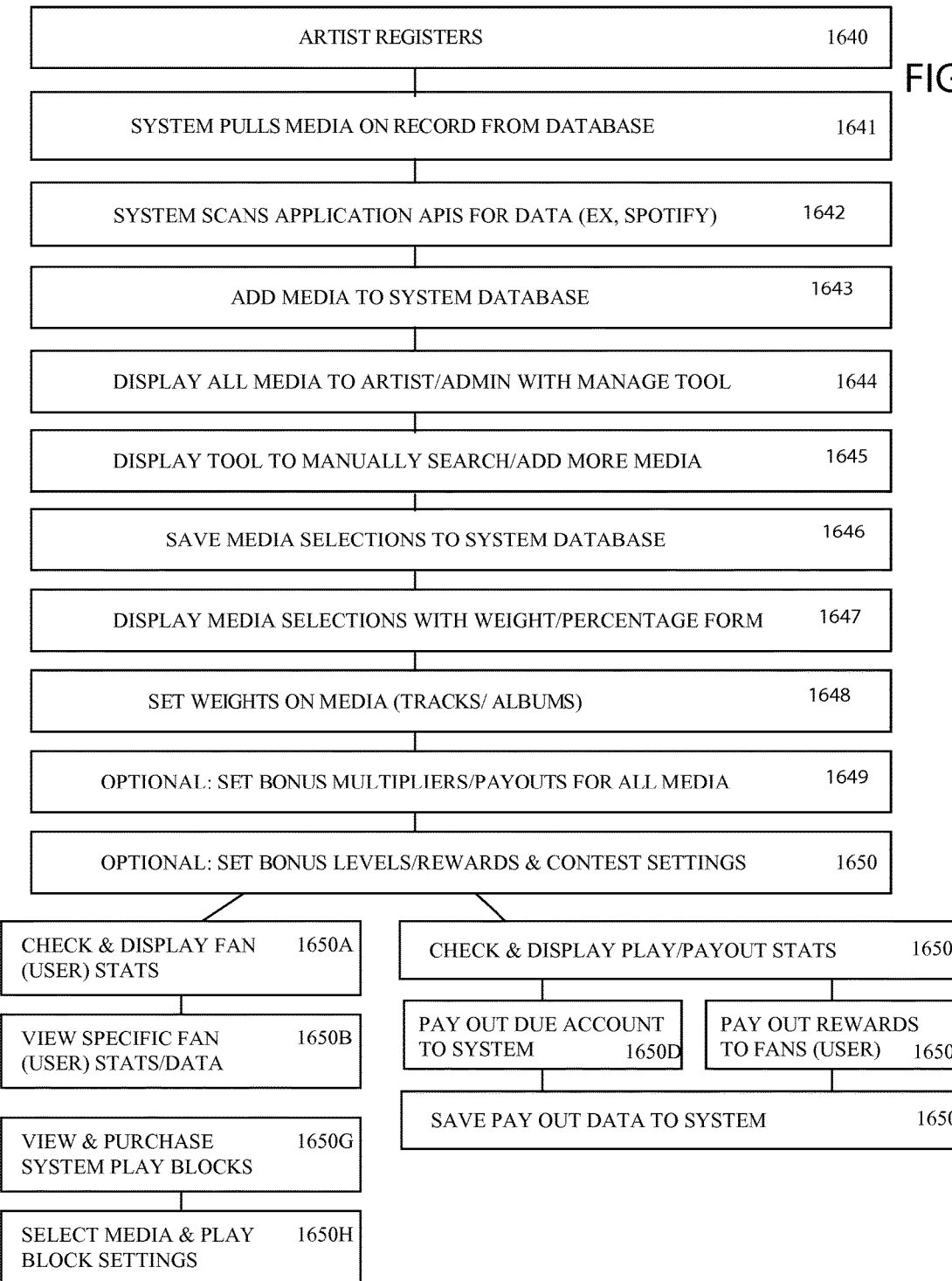
FIG. 16 is a flow chart for registering an artist/media owner with the system.

FIG. 16 is a flowchart showing the process for when an artist registers with the system using the Artist Admin Web Application 312 (See FIG. 3). This can be the artist, media unit owner, or system admin acting on their behalf via the Master Admin Web Application 313. For example, in step 1640 the artist or media unit owner can register with the system. An artist or media unit owner registering with the system can add his or her name, address, info, list of albums, show times, dates, band members, or any other identifying features. Next, in step 1641, once the artist has identified himself, the system pulls media information on record from a database. The system can then in step 1642, scan the external application API for data associated with these media units. Once the system identifies through this API the data associated with these media units, then in step 1643 it adds these media units to the system database with default settings. Next, in step 1644 the system displays all the media to the artist or media unit owner via an admin page and manage tool.

Next, in step 1645 the system would provide a display tool to manually allow a search to allow searching of this media or any additional media. Next, in step 1646 the system allows the media selections to be saved to the database and further identifies each media unit owner or artist. Next, in step 1647 the system allows the media unit owner or artist to display media selections with a weight or percentage used for selecting media units during user's auto play mode. When a user's app requests auto play media/tracks for this artist the system uses these weights to decide and select (as displayed in FIG. 17 steps 1776-1777). Therefore, in step 1648 the artist and/or media owner could set/save the weights on their media, such as on tracks and albums. For example, a media unit with a weight of 50 will be selected 5 times more often than a second media unit with a weight of 10. Next, in step 1649 an artist could incentivize listeners to listen to his media by allowing the listeners to profit from consuming their media. incentivizing users to consume an artist's media would result in higher royalties for the artist. An artist and/or media unit owner could set bonus multipliers for additional payouts for the use of particular media or media units. For example, an artist can have a 1.5× multiplier on all media plays. When a user plays this artist's track they earn 1.5× whatever the default points/bonus rewards. This enables the artist to incentivize users to consume their media by providing variable payback to that user in the form of extra points and rewards. Additional points, bonuses, rewards, multipliers and other incentives could be included to encourage the user to purchase premium accounts from the external applications, further increasing the money earned by the external application, the artist and the system. For example, a user with a premium membership to an external application might earn 2× the points playing media on that application than a non-premium user would get.

In addition, in step 1650 the system or the artist could set the bonus levels or rewards associated with contest settings. For example, an artist could set point levels user's would need to reach in order to receive a special reward from the artist. The system would track when users reach these levels and process the rewards and indicate the rewards to the artist needs to fulfill. Additionally, contests can be set up for artists enabling winners to be selected from a random selections from all users who earned points for an artist during the contest duration. Winners can also be selected from the top earning users or a combination of top earners and random selections.

Additionally, contests can be sub divided by location|rewards, enabling location based rewards such as local concert tickets. Additionally extra bonuses, points and rewards can be awarded from playing groups of media units within a timeframe. For example, if users use five tracks of media units in a particular set period of time, the artist may increase the points, multipliers, and or bonuses that the user receives for consuming the media unit. Because the artist or media unit owner is allowed to set these preferences for sharing his or her royalties via the points/rewards systems, the artist can then encourage users to use the artists media.

Other optional steps included for the artist or media unit owner at this stage (via Artist/Admin Web Apps 312-313) (See FIG. 3) can include checking and displaying the fan user stats in step 1650A, or viewing specific fan user statistics or data in step 1650B, and/or viewing and purchasing system play blocks in step 1650G, and/or selecting the media and play block settings for particular media units in step 1650H.

Alternatively, the system and the artist or media owner can select to display play and payout statistics in step 1650C. The artist can track the payments paid/due from the artist to the system in step 1650D. The artist can also view the user rewards they need to fulfill and enter in the paid fulfillment details after they give the user the earned rewards, via step 1650E. The system could save these system payouts and bonus/rewards payouts and save the payout data to the system in step 1650F.

Figure 17:
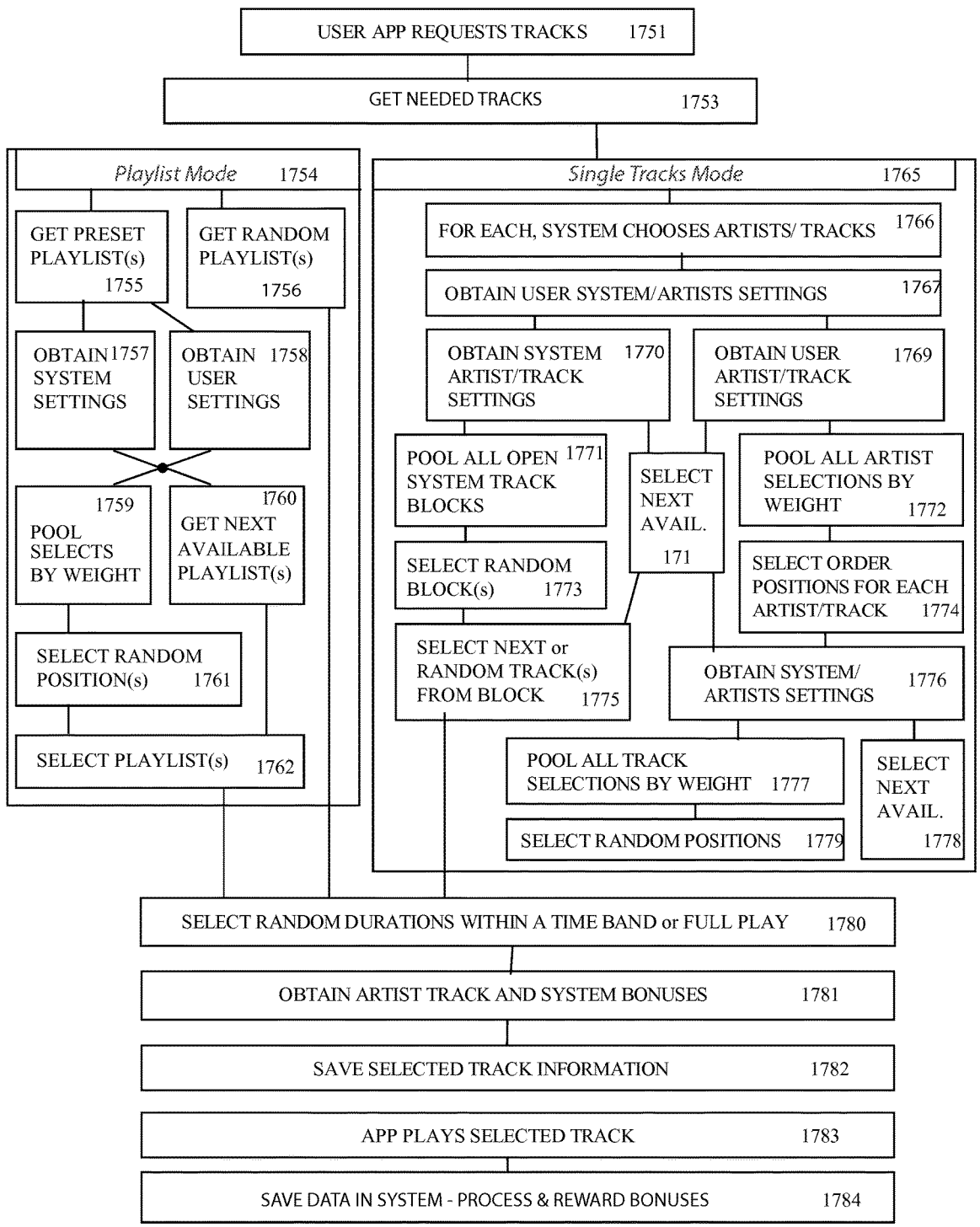
FIG. 17 is another example flow chart of a process of one embodiment.

FIG. 17 is the flow chart for the process for running the internal application and system once the user has registered and artist/media unit owners have registered. For example, the process starts in step 1752 where the internal application requests tracks or media units from the system database 301 in step 1752. Next, in step 1753, the system obtains these needed media units using the process in steps 1754-1764. Next, the system branches into two different paths to select media, a playlist mode in step 1754 or into a single tracks mode in step 1765.

With the playlist mode, in step 1754, the system can proceed to obtain preset playlists in step 1755 or to obtain random playlists in step 1756. To obtain preset playlists of media units the system can obtain the system settings in step 1757, or obtain the user settings in step 1758. Next, in step 1759, the system can pool these selections by weight, or alternatively obtain the next available playlists. Next, in step 1761 the system can select the random positions from the pool in 1759. Alternatively, in step 1760 the system can get the next available playlist. Next, in step 1762, the system selects the media unit selection. Next, if the system or the user selects to use the random playlists in step 1756, then the process proceeds to step 1780 wherein the system selects the random durations within a time band, a preset time, or full play in step 1780.

Alternatively, if the system or user selects the single tracks mode in step 1765 the process proceeds to step 1766 wherein for each media unit needed the system follows the process of steps 1767-1784 to choose the artists/media units. This process is started in step 1767, where the system would obtain the user/system artist settings. Next, in step 1768, if it is a media unit to be selected by the system, the system can obtain system artist and track settings, or alternatively in step 1769 if the media unit to be select is a user-selected option, the user can obtain user artist track settings. If step 1768 was chosen the system can proceed to step 1770 wherein the system pools all open system media unit blocks. Next, in step 1773, the system can select random blocks from this pool of available blocks. Alternately after step 1768 the system can select the next media unit block in queue. Next, in step 1775 the system can select the next or random media unit from the available media units in the selected media unit block. Alternatively, if the media unit to be select is a user-selected option via step 1769, the system in step 1772 pools all artist selections by the weights the artist set via their admin. Next, in step 1774 the system selects an artist from the selection pool created in step 1772. Alternately after step 1769 the system can select the next available media unit and proceed to step 1776. Next, in step 1776 the system obtains the system/artist settings. Once the system artist settings in step 1776 have been set, the system either proceeds to step 1778 to selects the next available track, or alternatively in step 1777 all the artist's media units are pooled by their weight settings and then random media unit selections are chosen from the options in step 1779.

Once the tracks or media units have been selected, the system can select the random durations for play within a preset time band, select a preset duration, or select the full play of a media unit. For example, the system could select a preset amount of time such as 31 seconds from a optional range of 30-33 seconds of play. Alternatively the system could select another range of play such as between 40-45 seconds and choose a time from that duration. Alternately the time can be chosen from a preset option (See step 1528 in FIG. 15). The system could through either predetermined settings or trial and error determine the minimum time necessary for play for the artist to receive a royalty for that play without being flagged by the external applications. Therefore, the time band could be set to be the amount necessary for time wherein a minimum amount of play of time would be sufficient to reward an artist or media owner without being detrimental to the users account and the systems.

Once the track or media unit has been played, the system could obtain the artist media and system bonus information and determine the proper rewards for their actions in step 1781. Next, in step 1792, the system could pull the media selections selected in the preference settings 1524 (See FIG. 15) and save this selected track information. Next, in step 1783, the external application could play this selected track or media unit. In step 1784, the system could save this data in the system and process the reward or bonuses for both the artist or media owner and the user/listener of the media unit (which happen during steps 1209-1210 See FIG. 12).

Figure 18:
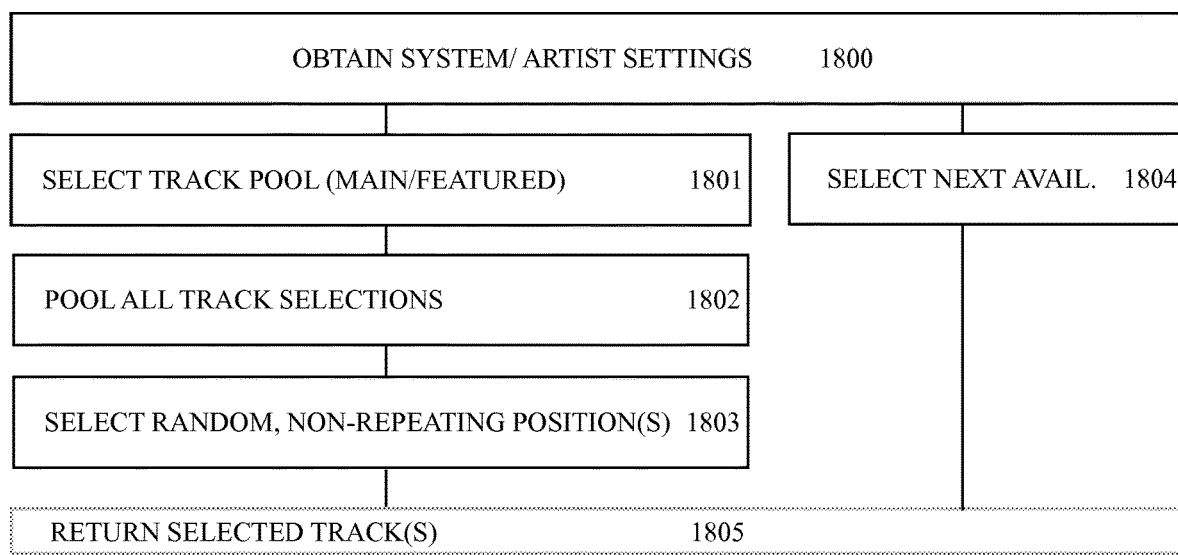
FIG. 18 is an example flow chart for selecting artist/media.

FIG. 18 is an alternate version or embodiment of selecting artist media than that shown in FIG. 17, steps 1776, 1777, 1778, 1779. For example, in step 1800 the system obtains the system/artist settings. Once the system artist settings in step 1800 have been set, the system either proceeds to step 1804 to select the next available track, or alternately in step 1801 an alternate desired track selection pool can be chosen, such as a 'default' or a 'featured' list. Next all the artist's media units are pooled by their weight/settings 1802 and then in step 1803, random, nonrepeating media unit selections are chosen from the options. Chosen tracks are then stored and passed on for further processing by the system 1805.

Figure 19:
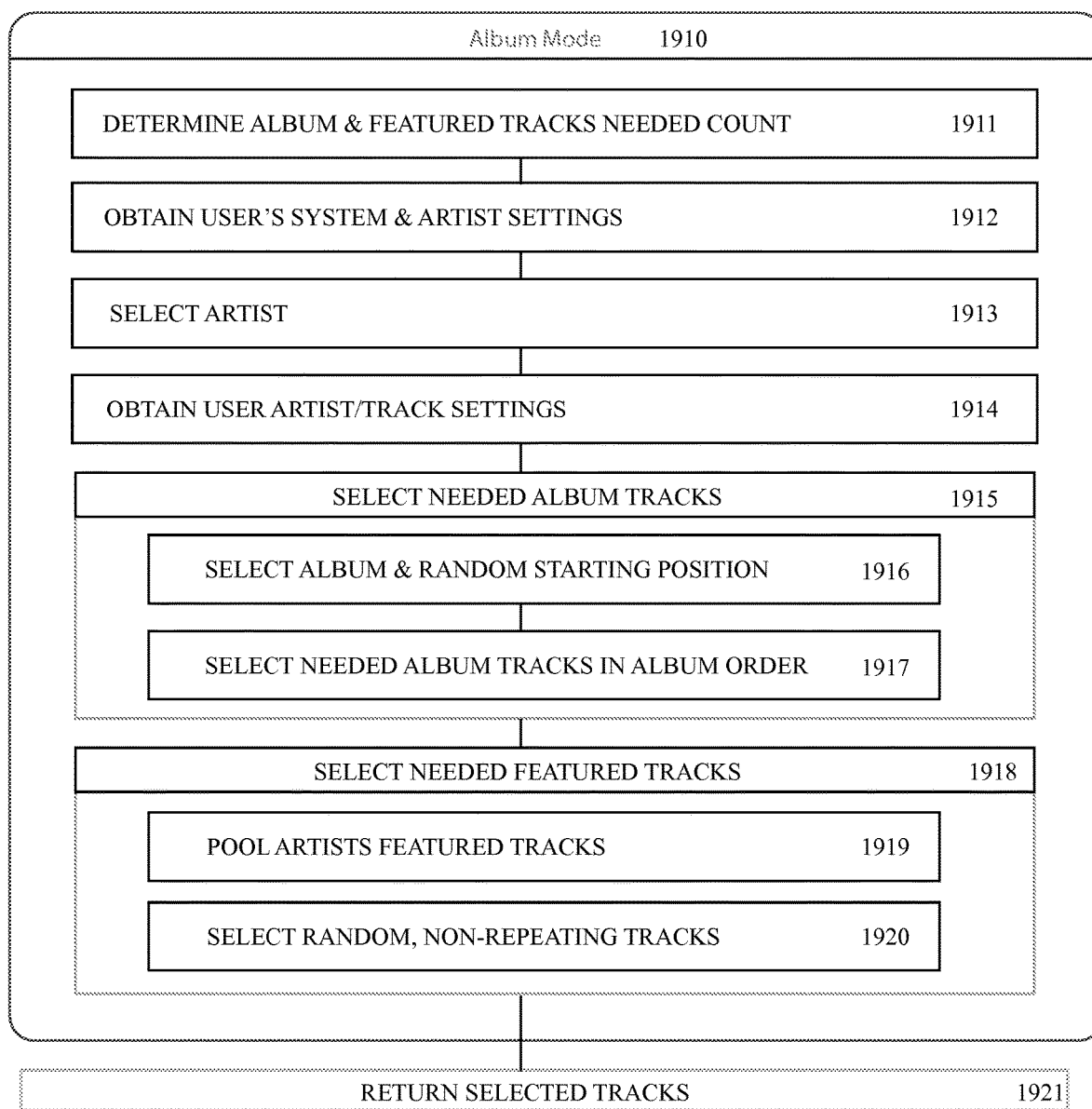
FIG. 19 is another example flow chart for selecting artist/media.

FIG. 19 is an alternate version or embodiment of selecting artist media than that shown in FIG. 17 steps 1754 & 1765. For example, with Album Mode 1910, the system can then proceed to step 1911 where the system determines the amount of tracks to be selected from an 'album' pool as well as number of tracks to be selected from a 'featured' pool of tracks. Next, in step 1912 the system obtains the user's system and artist settings. The system uses these settings to select an artist 1913. Next, in step 1914 the system obtains the user's artist and track settings. Next, in step 1915 the system selects the required count of tracks for the 'album' pool by first selecting an available album from the chosen artist and choosing a random starting track position 1916, and then selecting the desired album tracks in album order 1917, and repeating until all requested 'album' tracks are selected. Next, in step 1918 the system selects the required count of tracks for the 'featured' pool by first pooling all the available featured tracks from the chosen artist 1919, and then selecting random, nonrepeating tracks 1920 until all requested 'featured' tracks are selected. Next, the track selections are stored and passed on for further processing by the system 1921.

Figure 20:
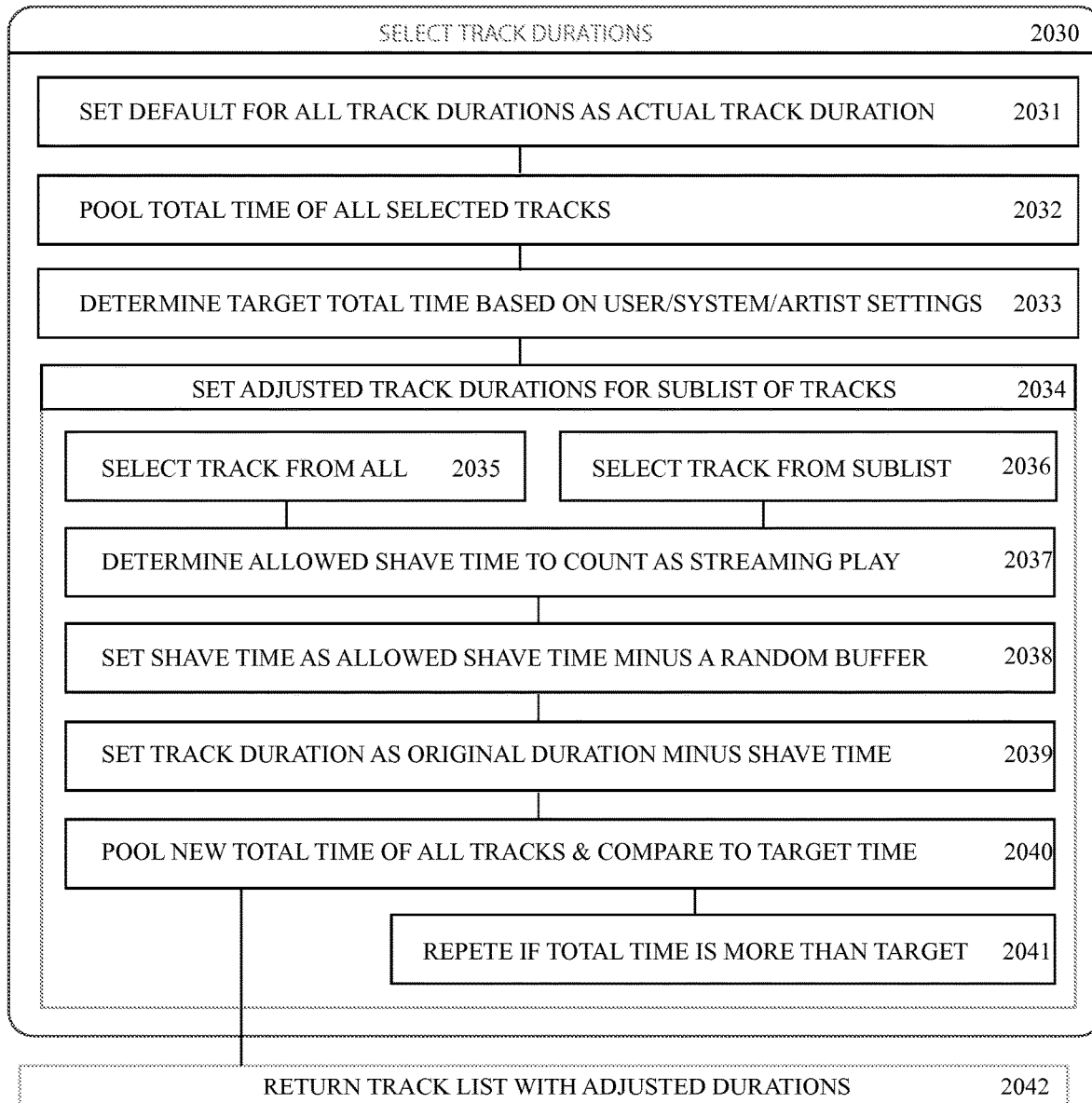
FIG. 20 is an example flow chart for selecting artist/media play durations.

FIG. 20 is a flowchart of a process for determining track durations for auto play mode. For example, FIG. 20 is a more detailed version or embodiment of selecting track durations than that as shown in FIG. 17 step 1780.

In step 2030 the system selects durations for a track list. With step 2030, the system can then proceed to step 2031 where the system sets the default track duration of each track as the actual duration of that track. Next, in step 2032 the system pools the total time of all selected tracks. Next, in step 2033 the system determines a target total time based on user, system, and artist settings. Next, in step 2034 the system adjusts the target durations of a sub-list of the tracks, as shown in steps 2035 to 2041. To adjust the target durations either a track is selected from the full track list 2035, or a track is selected from a sub-list of tracks, based on various conditions such as its duration in step 2036. Next, in step 2037 the system determines the maximum amount of time that can be removed from the selected track to be played and counted as a media unit play on the connected streaming service. The duration in step 2037 is determined by taking the tracks actual duration and subtracting the minimum play duration of to be counted as a media play unit. Next, in step 2038 the duration to be subtracted from the actual track duration is determined by using the result from step 2037 and subtracting a random duration buffer of 1 or more seconds. Next, in step 2039 the new track duration is set as the result of the original track duration minus the result from step 2038. Next, in step 2040 the system calculates the new total duration of all tracks in the list and compares this duration to the target total time duration from 2033. In step 2041 the system detects the total duration of the track list is more than the target total time and repeats the steps of 2034. Alternately, the system can detect that the new total duration of the track list is less than or equal to the target total time, and return the track list with adjusted durations to the system to be stored and passed on for further processing 2042.

Figure 21:
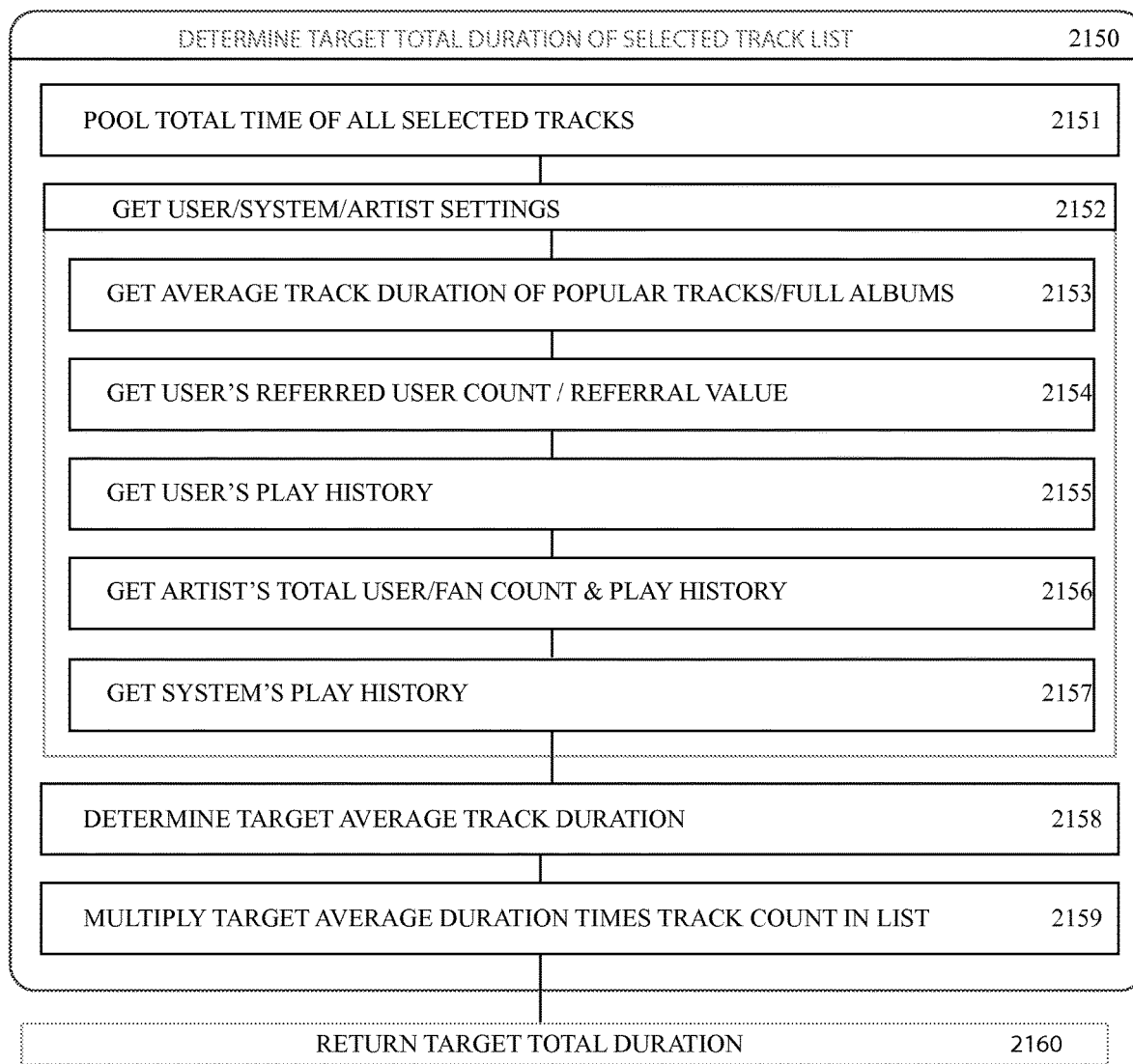
FIG. 21 is an example flow chart for selecting target artist/media play durations.

FIG. 21 is a flowchart of a process for determining a target total duration for a selected track list. FIG. 21 is a more detailed version or embodiment of determining a target total duration than that as shown in FIG. 20 step 2033. By calculating the target total duration of the selected track list, the system can determine how long to control the user or fan's play history.

In step 2150 the system determines a target total track duration for a selected track list. With step 2150, the system can then proceed to step 2151, where the system calculates the total time of the selected track list. Next, in step 2152 the system gets the user, system, and artist settings, as shown in steps 2153 to 2157. Steps 2153 to 2157 are non-limiting example settings that can be used for processing. For example, in step 2153 the system obtains the average track duration of selected popular tracks and/or full albums/playlists. Next, in step 2154 the system obtains the users referred user count and each referred user's referral value. Next, in step 2155 the system obtains the user's usage/play history. Next, in step 2156 the system obtains the artist's total user/fan count and usage/play history. Next, in step 2157 the system obtains the full systems usage/play history.

Using the data from steps 2151 to 2157 the system determines a target average track duration in step 2158. Next, in step 2159 the system multiplies the target average duration times the total track count in the selected track list. Next the system returns the target total duration for the selected track list to the system to be stored and passed on for further processing 2160. Thus, with this series of steps, the system can automatically calculate based upon the above criteria a pre-set amount of time to play each track for each user or for each play set. While the system can control the time or duration of play of each song. The system can also pre-set other criteria as well. For example, the system can also determine the play speed, as well as other play criteria.

Figure 22:
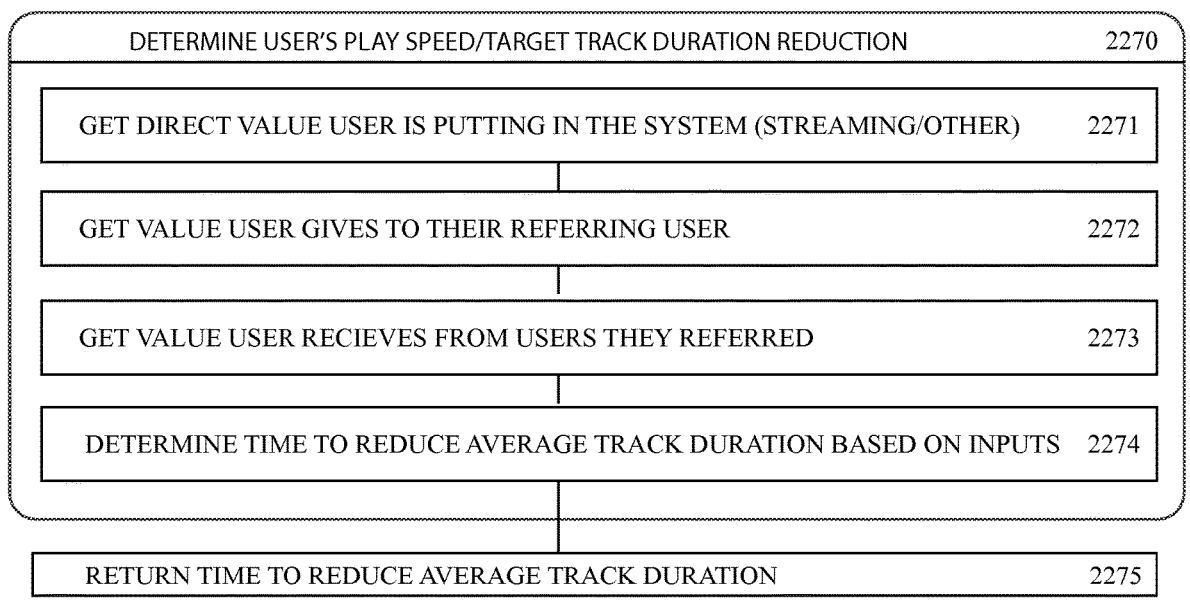
FIG. 22 is another example flow chart for selecting target artist/media play durations.

FIG. 22 is a flowchart of a process for determining a user's play speed and/or target track duration reduction. For example FIG. 22 is a more detailed version or embodiment of determining a target track average duration than that as shown in FIG. 21, step 2158.

For example, in step 2270 the system determines a user's play speed and/or target track duration reduction. Within step 2270, the system can then proceed to step 2271, where the system determines the direct value the user is putting into the system (via streaming, direct payment, and other methods). Next, in step 2272 the system obtains the value the user gives to their referring user. Next, in step 2273 the system obtains the value the user receives from users they have referred. Next, in step 2274 the system determines the time to reduce the average track duration for the user based on the data from steps 2271 to 2273. Next, the system returns the time to reduce the average track duration to the system to be stored and passed on for further processing in step 2275. Once this time for reducing the play time is determined, this can then be used by the system to target a larger number of songs or alternatively (hits) for usage of an artists work so as to dramatically increase the number of credits that may issue to an artist or content provider.

The providers of artistic content can also be those who could be classified as a content service broadcaster. With a content service broadcaster, that broadcaster cold have an API or portal link to the system to feed data to the system so that users of this content can then receive this information from the system rather than from a direct content service broadcaster. Thus, the link between the system and the content service broadcaster allows for the crediting of the usage of the artists account.

Figure 23A:
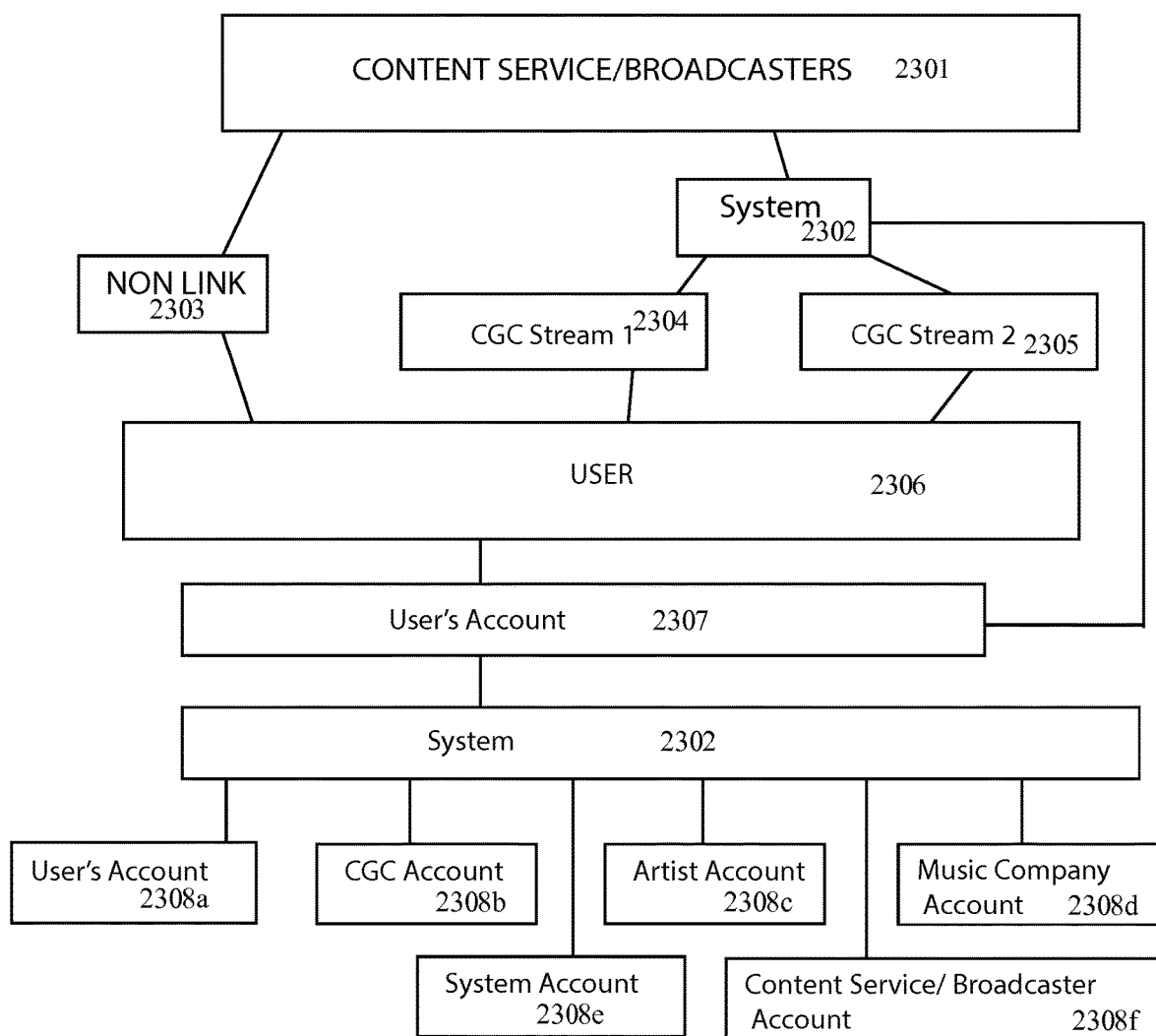
FIG. 23A is a schematic block diagram of a layout for communication between different groups.

For example, FIG. 23A discloses a schematic block diagram showing the flow of data from content service broadcasters 2301 to a user. For example, the content service broadcaster can be in the form of a radio station broadcasting a signal to user for listening to a radio station. This could be any sort of general radio station such as a satellite-based radio station or a FM or AM based radio station playing for example music. The user can listen to these content service broadcasters 2301 through a non-linked connection. Alternatively, if user were to login to a system 2302 for tracking these content service providers such as that disclosed above, that system would receive the feed from the content service providers 2301 and then identify the song or content, and then feed this information to a computer-generated content provider (CGC) such as CGC provider 2304, or CGC provider 2305 which would then stream this information to a user 2306. A computer generated content provider differs from a broadcaster because a broadcaster does not automatically track on a per user or per consumer basis, the number of listeners or consumers of art for the broadcasting of each piece of art.

Once the user is logged into the system 2302, the connection to the system would allow the user to access these CGC providers so that the CGC providers would provide the music or art rather than the broadcast channel. Because the user 2306 is connected to the link of the system 2302, any selection that is created by the broadcast provider 2301 would then be credited to the user's preliminary account 2307. This user's account 2307 would be stored with the system 2302. Because this information would be retained, the user's preliminary account 2307 would then credit the user's monetary account 2308*a*, the CGC account 2308*b*, the artist's account 2308*c*, and a music company account 2308*d*. In addition the system 2302 can also control the system account 2308*e* and the content service/Broadcaster account 2308*f* as well. Thus, the system 2302, can then selectively credit or debit the system account 2308*e* or selectively credit or debit the content Service/Broadcaster account 2308*f*. Thus, there is essentially a computer network with an intermediate date feed for receiving data from a content service broadcaster to analyze the data provided by the content service broadcaster and then transform this information into a new data stream which then provides content to a user 2306.

Figure 23B:
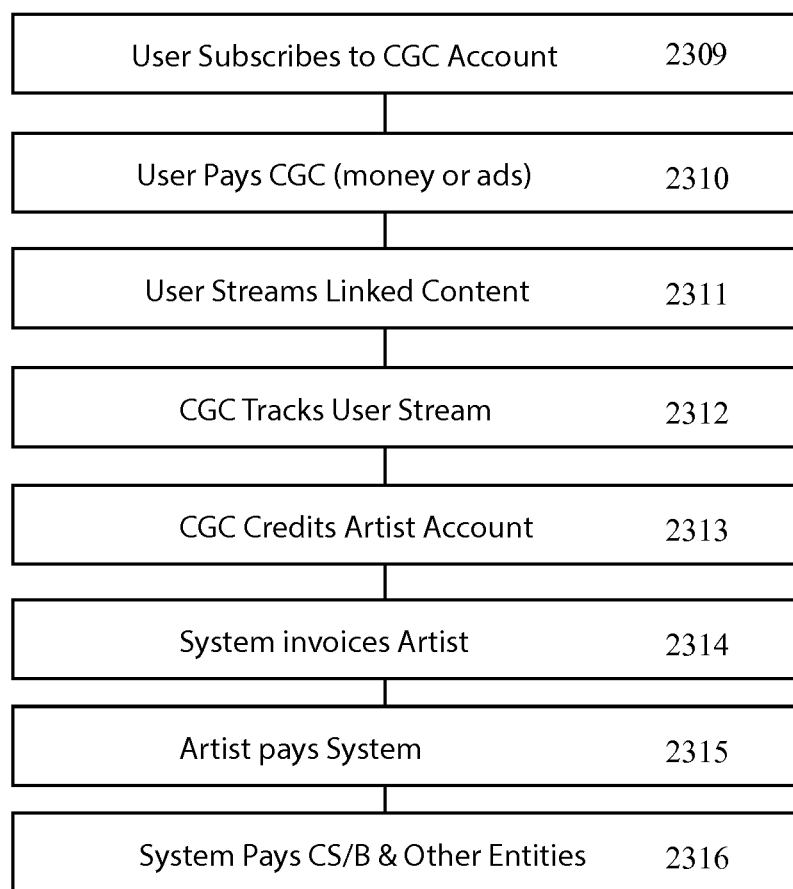
FIG. 23B is a flow chart for the process for rewarding users of content based upon the artists content that is consumed.

For example, in step 2309 as shown in FIG. 23B the user can subscribe to the CGC account. Next, the user can pay the CGC account in step 2310. This payment can be either through payment of money or through the viewing of advertisements (ads). This viewing of advertisements can be a form of currency because the viewing or listening of advertisements can generate revenue for the CGC account. Next, the user streams linked content in step 2311. This step results in content being streamed to the user's device so that the user listens or views the content with intermittent advertisements being streamed to the user if the user has allowed for the viewing or listening of advertisements. Because this system is computerized, there can be thousands or even millions of simultaneous users simultaneously receiving automatic streams of data of artistic content for consumption. In addition, because the system is computerized, this information can then be processed by the system such as system 2301 via an application server such as server 21, to automatically calculate rewards for multiple different accounts for each stream of artists content. These different accounts are listed below. In addition because this system is configured as a computerized system over a computer network, different accounts can be simultaneously credited in real time to provide instantaneous updating of each participant's account. This provides a real time feedback for users and artists so that artists can change a weighted average of rewards, and users or consumers of content can automatically switch to consuming different tracks from artists based upon the rewards generated and any pre-set preferences set by the user.

Next, in step 2312 the CGC tracks the user's stream of data to determine which data components such as songs or video content that the user has consumed, and which advertisements that the user has consumed (i.e. listened to, viewed, or clicked on). Next in step 2313, the CGC can then credit the artists account based upon the amount of content that the user has consumed. Thus, for example the user could have consumed one song, multiple videos, art content or any other type of content. The CGC can then provide a point value or nominal monetary value for each song, each, video or other type of artist content. Thus when this art is consumed, the associated value in points or monetary value is credited to the artists account. Thus, this system is configured to transform streams of data such as a broadcast stream into tracked streams of data which then result in a tracking for an eventual crediting of the account for the user.

In addition, because the user is consuming the artist's music or art, the system can be configured so that the artist reimburses the user of the content. This type of rewards system is beneficial to the artist because if the user is rewarded for listening to the artist's music, then the user would be more likely to listen to this music, or consume the artist's content in the future.

Next in step 2316 the system pays the content providers such as content service broadcasters (CS/B) and other entities.

Figure 24:
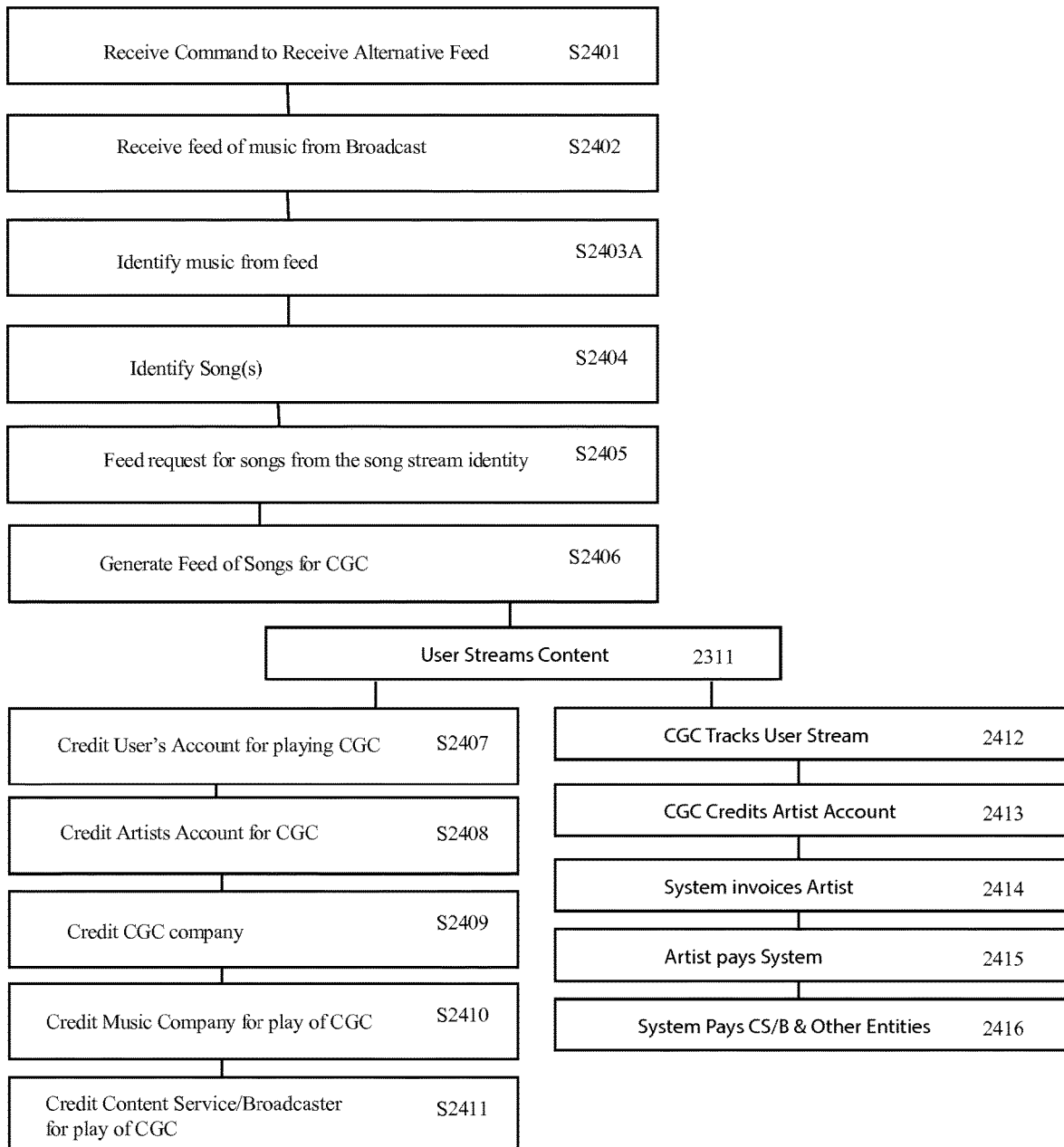
FIG. 24 is a flow chart for a more detailed process for rewarding users of content.

FIG. 24 shows a more formalized process for conducting the process described generally above. For example, once the broadcast is initiated, the user can login such that the system would then receive a command to receive an alternative feed in step S2401. This alternative feed could be in the form of a broadcast which is fed into the system 2302. Next, in step S2402 the system 2302 would receive the broadcast feed from the broadcast provider. In step S2403*a* the system would parse the song by identifying the tone, the pattern and other song identification information such as rhythm, meter pitch and tone. The song recognition system would identify the sound patterns in the song, such as the rhythm, meter, tone and pitch of a song to match those sound patterns with a database, and then determine the identity of the song.

Next, in step S2404, the system would then identify the songs from the songs that were determined in step S2403A. Once the song has been identified, the system 2302 in step S2405 feeds request for the song from the system 2302 to any one of CGC stream 2304, or CGC stream 2305. This request in step S2405 would result in the generation of a feed from the CGC provider to the user 2306. This feed in step S2406 would result in the crediting of the users preliminary account in step S2407, and ultimately result in the crediting of the users monetary account as well. In addition, if the user's preliminary account, and thus its monetary or reward account has been credited, the system would also credit the artist's account in step S2408, the CGC company account in step S2409, and the music company account in step S2410. In step S2411 the content service broadcaster is credited for the playing of the CGC.

Alternatively, the system can proceed from step 2311 to step 2412 wherein the CGC tracks the user stream. By tracking the user's stream and recognizing the art that is consumed, the CGC system can then credit the artists account in step 2413. Next in step 2414, the system can then invoice the artist. In step 2415 the artist can pay the system an associated fee which can then be a percentage of the royalties received by the artist. Next, in step 2416, the system can then pay the CS/B and other entities from this payment from the artist. In this way, the system can track the usage of art, and then credit user's accounts based upon usage of the art as a percentage or portion of the artist's royalties. This system then provides an incentive for users to consume an artist's work, and it also allows for artists to reward their users.

Figure 25:
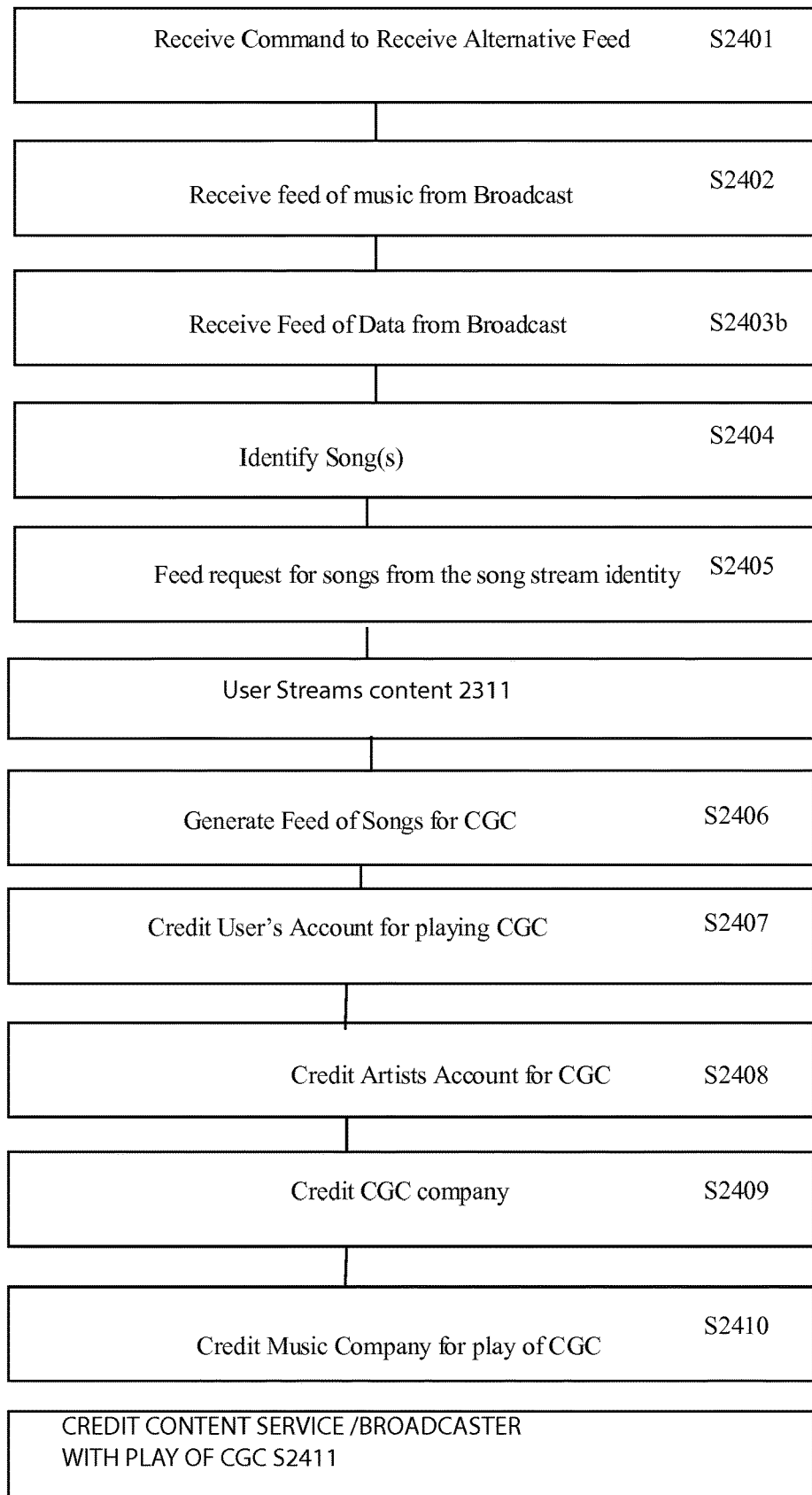
FIG. 25 is a flow chart for providing music content in a broadcast feed.

FIG. 25 is an alternative flow chart wherein the process is similar however in step 2403*b* the system identifies the song from an API data feed from the broadcast channel rather than identifying the song via a song pattern recognition.

Figure 26:
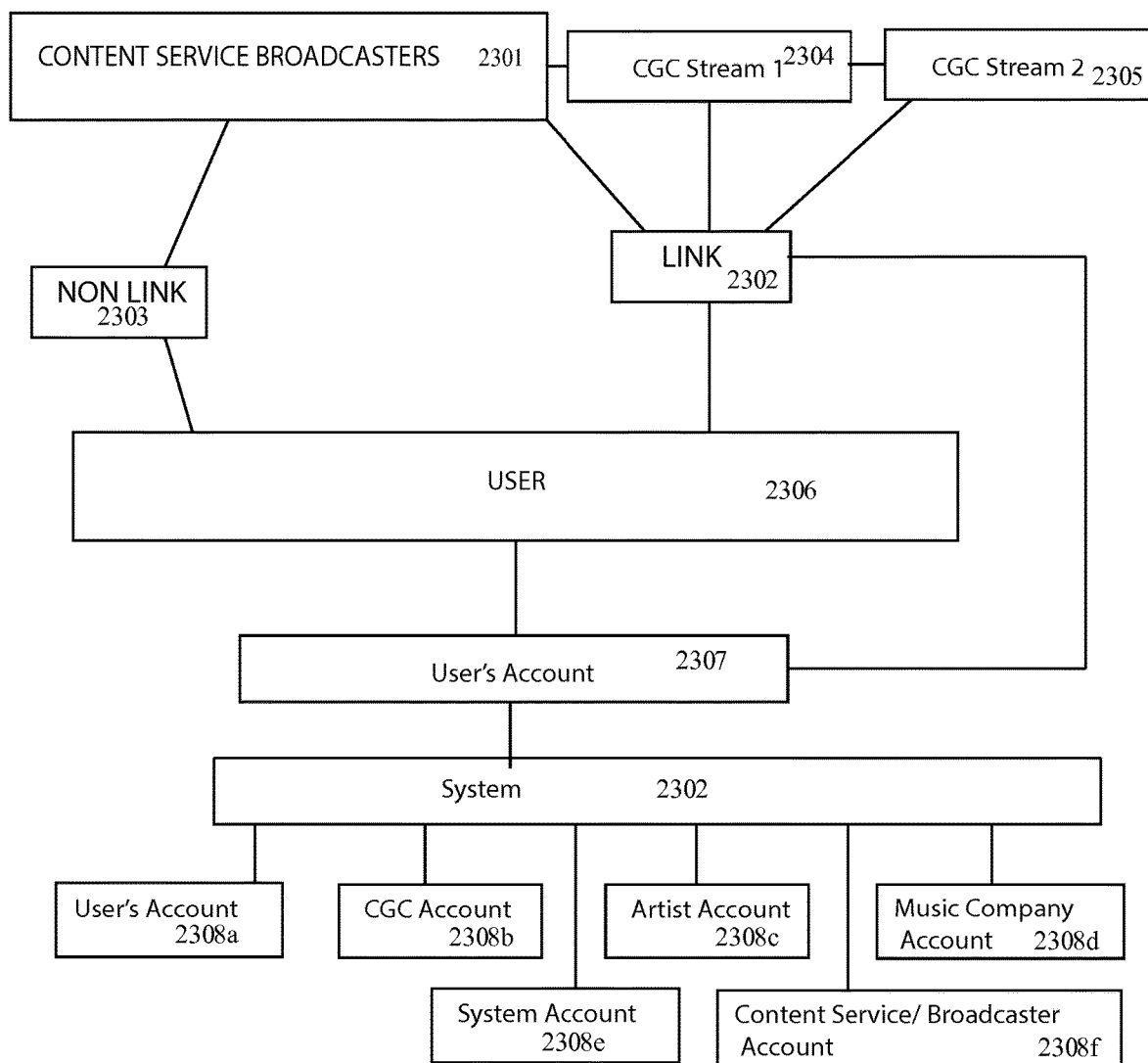
FIG. 26 is a block diagram of the data flow of data between content service broadcasters and users.
Figure 27:
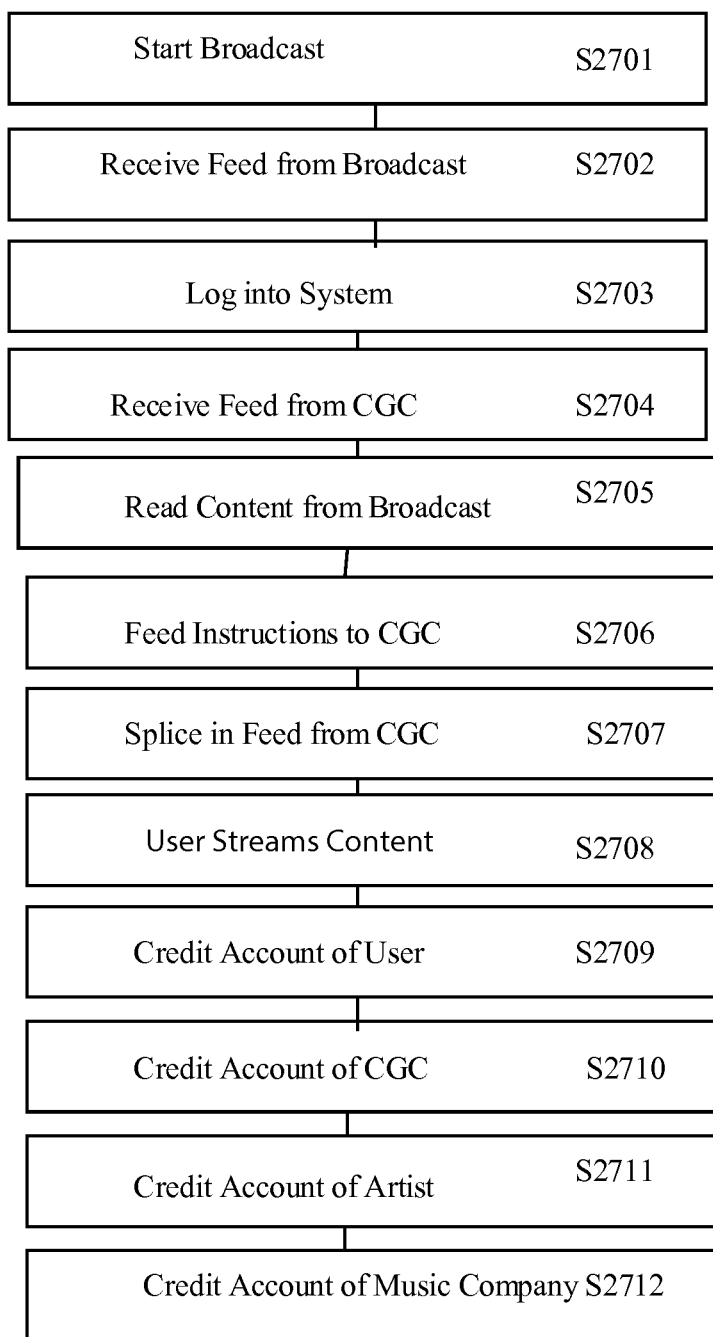
FIG. 27 is a flow chart for a process for transmitting instructions between parties for different feeds.

FIG. 26 shows a schematic block diagram of a different structure showing feeds wherein with this design, a content service broadcaster 2301 would encourage listeners to link with a CGC streaming company such as CGC stream 2304 or CGC stream 2305 to receive the song content from the CGC stream in alternative to the Content Service Broadcaster. With this design, the Content service broadcaster CS/B would then feed a data link to the system 2302 which would control the feeding of content from any one of the CGC stream content providers 2304 and 2305 and the broadcaster 2301.

A more detailed process described above is shown in FIG. 27. For example, with the start of the broadcast in step S2701, the user would then receive the feed from the broadcast step S2702. During the broadcast, the broadcaster would then instruct the user to log into the system 2302 in step S2703 so that the user could then receive feed from the CDC writer in step S2704.

Next, the system 2302 would read the content from the broadcast in step S2705 This content could be in the form of a series of instructions to pull songs from the CGC provider, or a set of instructions to break or pause stream of content from the CGC provider so that the broadcaster could provide its own content. Thus as shown, these instructions are fed to the system 2302 in step S2706, wherein the feed from the CGC system 2302 is then spliced in between the broadcast in step S2707.

Next, in step S2708 system would read the content from the broadcast and the CGC provider and then determine the content that should be credited to the user account in step S2709. Thus, once the user's account is credited, the accounts of the CGC provider is to be credited in step S2710, the account of the artist is to be credited in step S2711, and the account of the music company is to be credited in step S2712.

Figure 28:
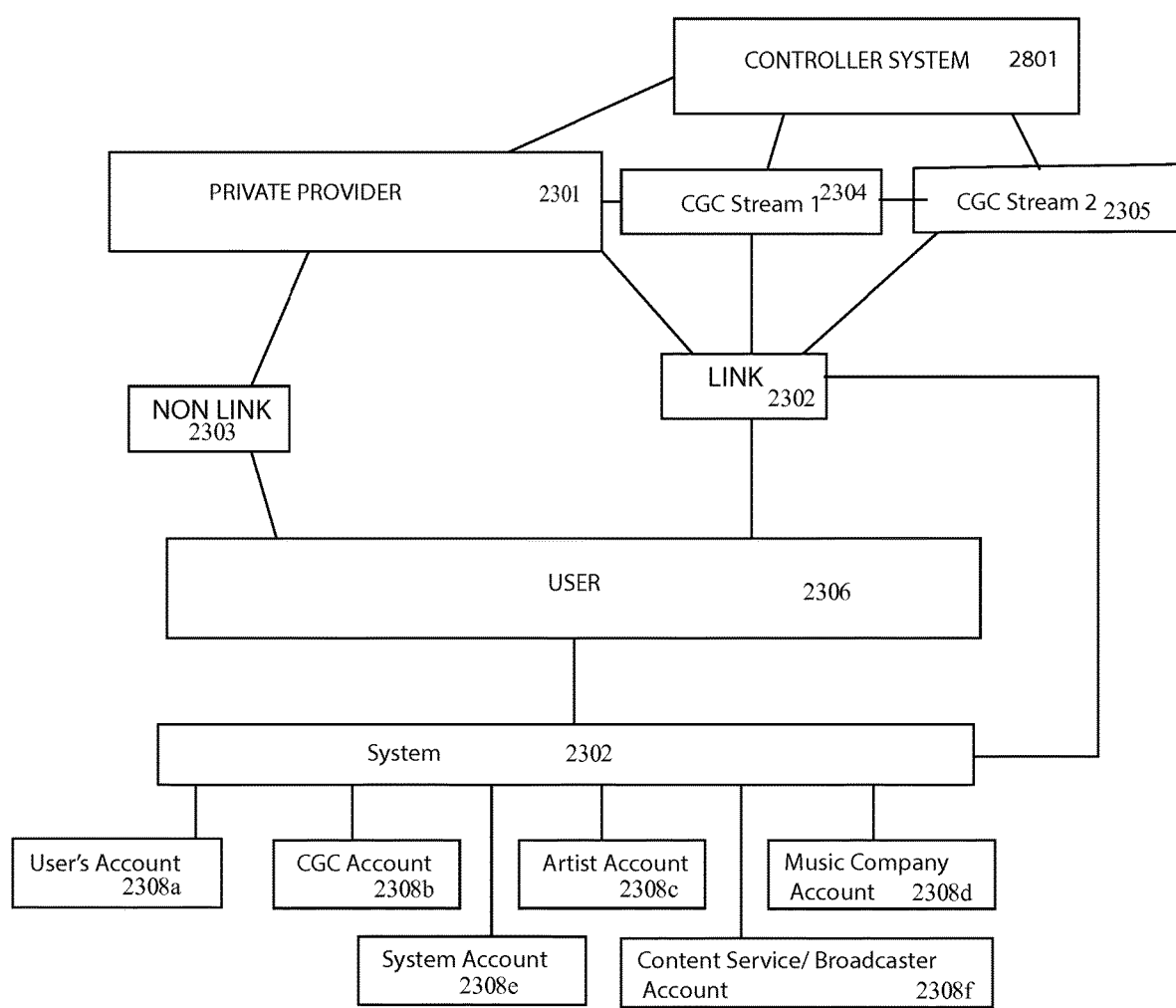
FIG. 28 is a block diagram of the flow of data between different parties.

FIG. 28 shows another configuration outlining the flow of data wherein a user in the form of a private provider 2301 has a connection to a controller system 2801 wherein with this controller system there is a controller in the form of an application server which controls CGC stream 2304, and CGC stream 2305 to control the production and presentation of information such as a music stream to a user logged into link 2302. In this way a private provider can simply feed the controls of the CGC stream 2304 or 2305 to provide a private radio show to users which then allows the users to receive this private radio show through a computer generated stream via link 2302.

Figure 29:
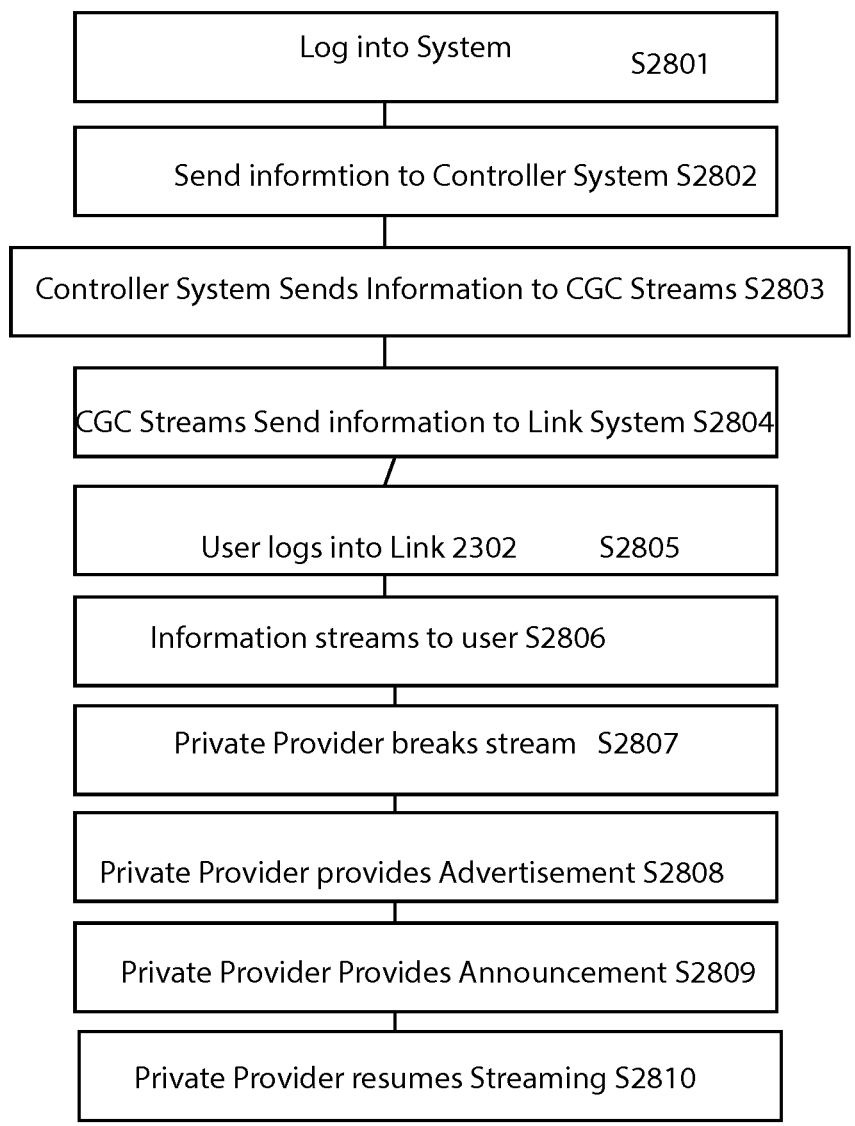
FIG. 29 is a flow chart for the process for hosting a broadcast program.

FIG. 29 shows the process for communicating between the private provider 2301 and the controller system 2801. One purpose for this process is to allow a private provider to break a link or stream of data to provide an intermediate advertisement. For example, the private provider who may be in the form of a private host or disc jockey can log into a computer system and then be connected to a controller system 2801. This type of connection can be similar to that shown in FIG. 1 wherein in this case, the controller system 2801 essentially acts as a specialized "application server" such as application server 21. Thus a user who may be logged into a computing device such as computing device 25 (See FIG. 1) can then communicate directly with application server/controller system 2801 and send information to the controller system in step S2802. Next, in step S2803 the controller system 2801 can send information to the CGC streaming system such as CGC streaming system 2304 and CGC stream 2305. These CGC streaming systems are also in essence "application servers" such as the application server 21 shown in FIG. 1 and described above. This information can be a data stream to control the fees from the CGC streaming system to a user. Next, in step S2804 the CGC system sends information to the link system 2302 which feeds the data in the form of digital media to a user. Next in step S2805 if a user logs into the system, or link 2302, the user would receive this data stream in step S2806.

Next, the private provider can periodically break the stream in step S2807. This breaking of the stream can be for the purpose of making an announcement or for providing additional information such as an advertisement. Thus, in step S2808 the private provider can provide an advertisement, or in step S2809 the private provider can provide an announcement. This step occurs with the private provider sending instructions to controller system 2801 and then having controller system 2801 control the feeds from CGC stream 2304, and CGC stream 2305. Next in step S2810 the private provider can provide additional streaming of the data.

FIG. 30A shows a flow chart for another process for another embodiment. In this embodiment, a host can activate a show or broadcast in step S3001. Next, in step S3002 the host can view the initialized songs. Alternatively, the host can initialize and select new songs in step S3003. Alternatively, and/or simultaneously, in step S3004, the host can activate the audio/visual A/V broadcast. The host can perform all of these steps by connecting with controller system 2801 via a remote computer such as via remote computer 25 in a manner described above. Thus, these steps are performed by a microprocessor such as microprocessor 222.

Following either step S3002 or step S3003, in step S3005 the host can select a song. Once the song has been selected, in step S3006 the host can set the play options. Thus, in step S3007 the host can set the order to play in the future, or alternatively in step S3008 the host can play the song now (at present). If the host sets the song to play in the future in step S3007, the host can then save the song in a song queue in step S3009.

Alternatively, if the host activates the A/V broadcast then the system could proceed to step S3010 wherein the songs can stream with the hosts input on the user's device. When the host wants to interrupt the song playlist to make an announcement, the system such as controller system 2801 can automatically lower the sound on the remote user's devices by sending a coded signal to allow for the dubbing in of the hosts voice into the user's device.

Once the song has completed or is near completion, in step S3011 the system can set the song end action such that the system proceeds to play the next song or A/V broadcast.

FIG. 30B shows a flow chart for a further process shown in FIG. 30A. Thus, following step S3011, this step shows that in step 3012 the system such as controller system 2801 on the song end can then proceed to step S3013 to activate the broadcast and the host stream, or alternatively in step S3014 play the next song in the queue in step S3014. Thus, the system would then proceed back to either step S3010 to continue the AV streaming, or to step S3005 to select a new song and then ultimately play a new song in step S3008.

Figure 31:
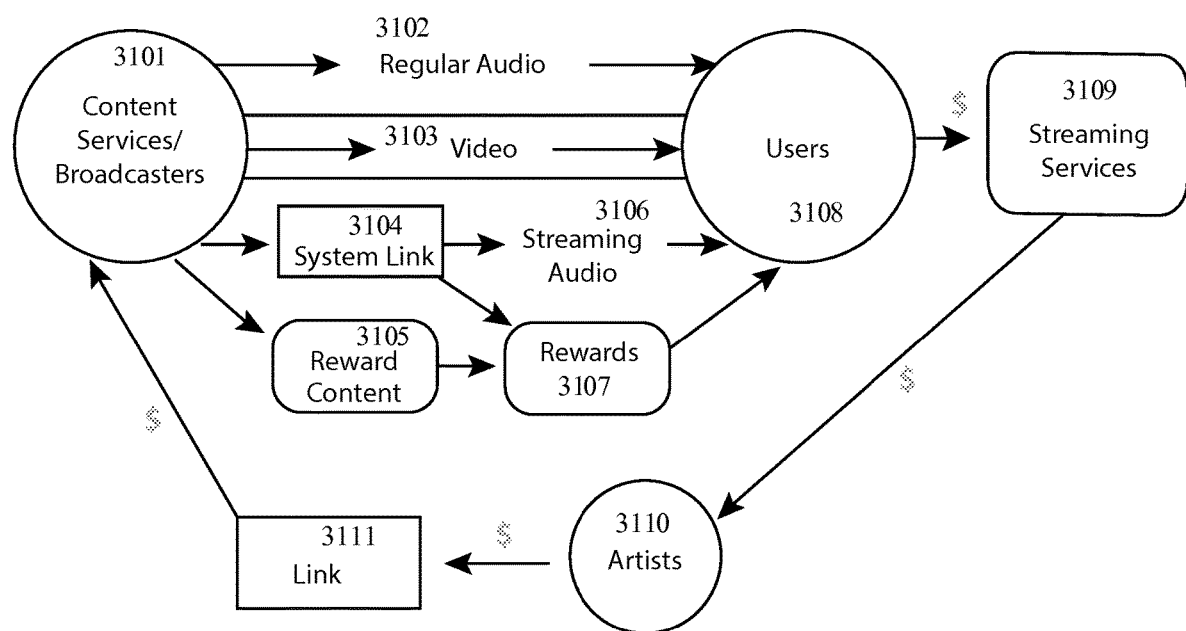
FIG. 31 is a schematic block diagram showing the flow of money or rewards between users, artists, agencies, and those who consume content.

FIG. 31 shows the flow of information between the different parties. For example, there is shown content service broadcasters 3101 which provide a stream of regular audio 3102, or video 3103 to users 3108. Alternatively, the content services or broadcasters could, through a link 3104 from a remote computing device such as remote computer 25 to a controller system 2801 serve an audio stream 3106 to users 3108. Alternatively, content services or broadcasters could also serve rewards content 3105 which is in the form of rewards 3107 to users 3108 as well over a computer network. Once this content is fed to the users 3108, the streaming service providers 3109 receive this feed information so that the streaming service providers 3109 can credit the artist's accounts 3110, by sending this information back to the system link 3104.

In this network there is another link 3111 which serves as a network link between the artists accounts 3110 and the content service broadcasters 3101 such that the artist can provide payment back to the content service broadcasters 3101 a form of royalty payment which can then be held in escrow and then distributed to the users in the form of rewards content 3105 or through network link 3104 as a form of rewards 3107 to the user 3108.

Figure 32:
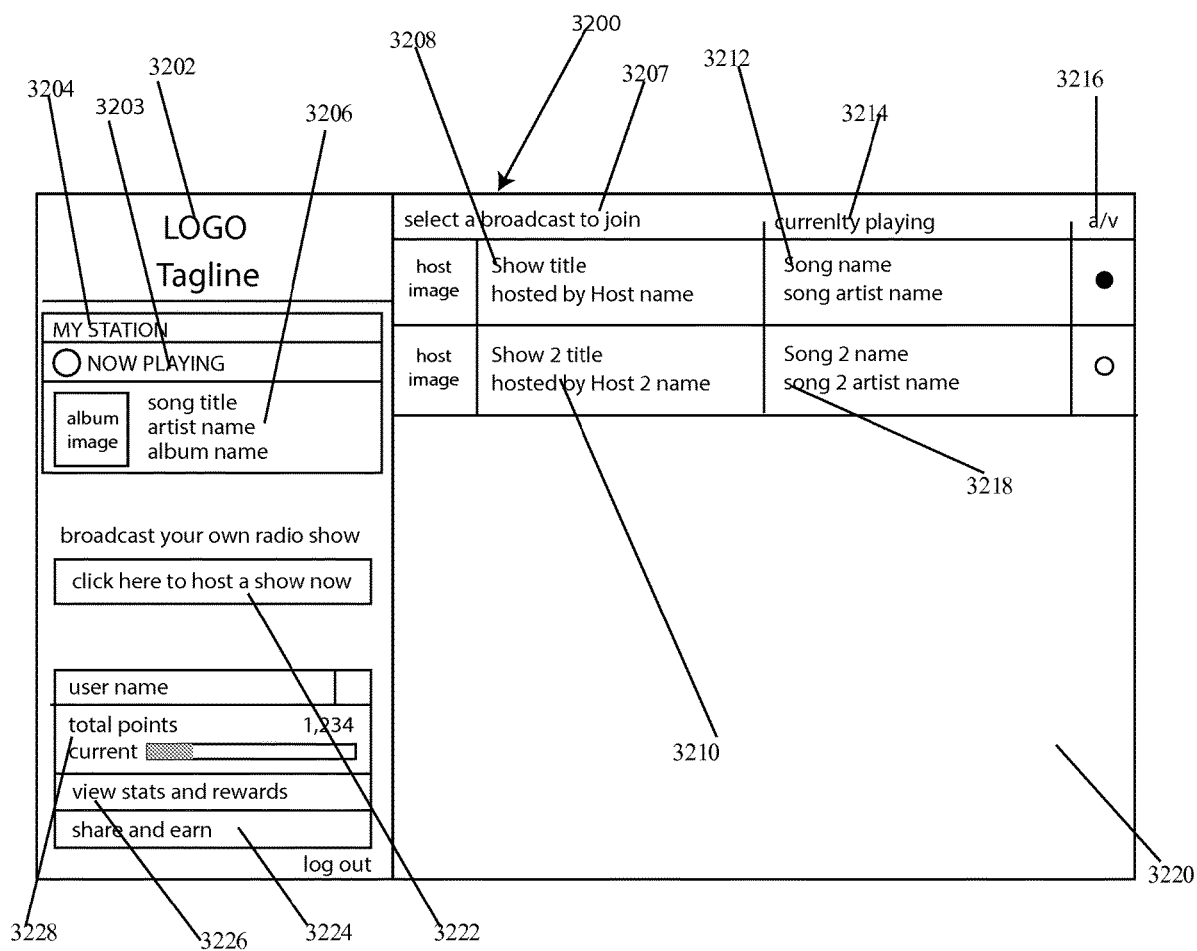
FIG. 32 is a wireframe of a screen used by a host providing content.

FIG. 32 is a wireframe of a screen used by a user such as a host or a listener or consumer of content of a program which distributes content from a content service provider. In this setup, a host is a party that can provide a show complete with the provision of artists, and their work along with commentary for the users. The elements of the show can be composed of multiple forms and sources of media, such as online video, or a live stream mixed with music sourced from a third party music streaming service. For example, a host could provide a live broadcast in the form of a show such as a radio show or a video show where video is streamed along with audio along with a synced music track. When a listener consumes the show, their interface will sync with the host's requested show elements, play the hosts selected media, as well as set a digital marker on the server to trigger an application on the users machine to play the hosts selected music choice, and sync the timing if needed.

Thus, there is a screen 3200 which includes a first section 3202 having a logo or tagline. Next, a second section 3203 indicates whether the song or art is either "playing" or is being presented. Section 3204 indicates the station that is playing and section 3206 indicates the information about the art such as the song title, the artist's name, and the album name.

Figure 33:
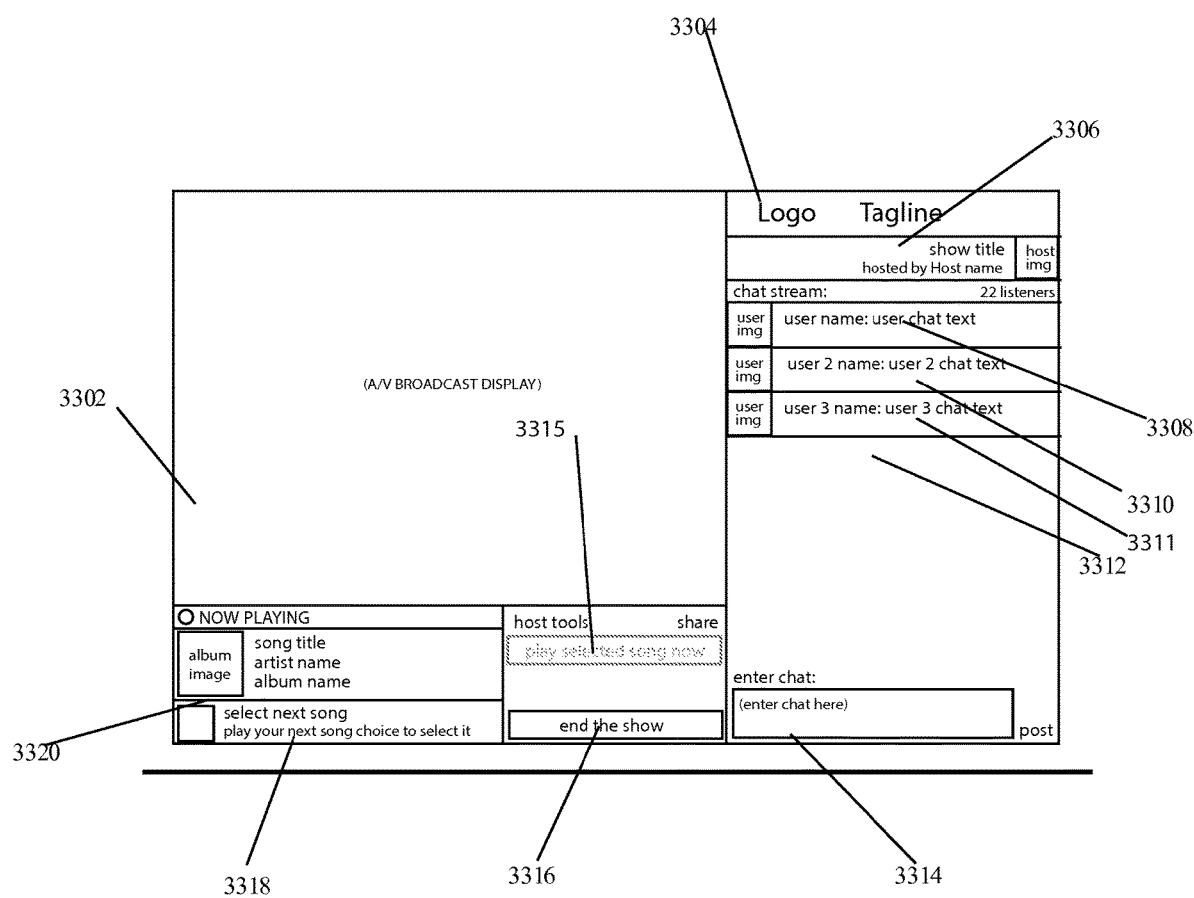
FIG. 33 is an alternative embodiment of a wireframe of a screen used by a host for providing content.

Section 3207 indicates the broadcast presented by any and/or all hosts. Users can select any one of these shows which then allows the user as a listener to view an individual show (See FIG. 35). Alternatively the user can select to host his or her own show as shown in FIG. 33. Section 3208 indicates the host's image as well as the show title and the name of the host. Section 3210 shows the alternative show that can be presented by the host. Adjacent to these sections is header section 3214 which indicates which song is currently playing which is associated with a particular host. In addition, there is another section 3218 which includes a second section listing another song associated with another show presented by a host. In section 3216 there is a radio button indicating the status of the show to indicate whether the host is hosting a show and the broadcasting status of the show being hosted.

Section 3220 is additional space for listing additional shows or streams of media, as well as other data such as: credits for shows, host information, advertising, or promotions.

In another embodiment, the host is not limited to controlling one shows. Instead, the host can host multiple simultaneous shows such as two (2) simultaneous shows, three (3) simultaneous shows, four (4) or even more simultaneous shows.

Thus, the host or general user in section or button 3222 can click on a button which allows the user to become a host or a current host to add an additional show to host. In addition, there is also a section wherein the host can view the points that are generated by being a user as well as by the host for hosting his/her show. This view shows the total points earned in section 3228. Thus, this section can show any parties points to be shown such as a host, a viewer or user or any other party. In addition, in section 3226 the user can select a button to view statistics and rewards earned by the host or any other user. Another section displays the points or rewards that the host or any other user can share and earn as well.

FIG. 33 is a screen shot for an active individual show. This screen is presented to the host once the host has selected a particular show in FIG. 32. For example, in this screen 3300 the user can have a screen section 3302 wherein the A/V broadcast is displayed to the host. In section 3304, there is a header showing the logo/tagline for that section.

In another section there is a show title section 3306. Below this section are a plurality of sections 3308, 3310, and 3311 which indicate the different users engaged in a chat stream. In section 3314, the host can also enter his/her chat information as well.

In section 3315, the host has the option to play a selected song. When there are no more host songs left in the queue, then that section is greyed out and is not an option for the host. In section 3316 the host can select a button to selectively end a show.

Section 3318 is a region to prompt the host to select an additional song to play if there is no additional song in the queue. This section can be configured to provide an additional display such as blinking to display that an additional entertainment property should be inserted into the queue. This region 3318 can be replaced with region 3404a-f to show the total entertainment properties in the queue. Once an entertainment property has played out or has finished, the next entertainment property such as a song is promoted to play in section 3320 wherein the information about the song is displayed on a screen. As long as an additional song in section 3404a-f is listed, the play next song button in region 3515 is not greyed out. Section 3426 and section 3526 indicates the status of the broadcast. However, when the user (host or consumer) is not consuming parts of the show, corresponding adjacent sections 3427 and 3527 each comprise a button which when activated allow the user to sync with a current broadcast.

FIGS. 34A, 34B and 34C show the different variations for the lower left section of the screen shown in FIG. 33. Thus, in FIG. 34A there is shown an active broadcast wherein in section 3406 a series of host tools are shown. In section 3408, there is a button allowing the host to play a selected song. In section 3410 there is a button allowing the host to end the show. In section 3404 there is a section showing the graphics and text associated with the next song to view and in section 3402 there is a section showing the graphics and text associated with the song currently playing. In FIG. 34B there is shown a different host tools section 3406 which shows buttons for pausing an A/V stream, a button for ending a song and starting another song with button 3422, and another button 3440 allowing a user to play a next song.

FIG. 34C shows another section wherein there is a section 3406 which includes host tools wherein the host has a button 3434 wherein the host can start an A/V stream over a song. In addition, there is another button 3438 wherein the host can start an A/V stream at the beginning of a song as well. This A/V stream can include commentary or live announcements from the host. There is also another button 3440 wherein when the host selects this button they can play the next song. There is also another button 3405 which when activated, allows the host to view and arrange their song queue as shown in FIG. 34D.

FIG. 34D shows another section which includes multiple sections taken from section 3404 which allows the user to manage his/her songs. For example, there is shown a plurality of sections 3404a-3404f which outline the different artistic components or songs associated with a song queue. Each of these sections includes a button which is configured to allow the user to adjust the order of the song queue or to delete the component from the queue. In addition when a user using the interface shown in FIG. 33 selects a new song or artistic component using a button in section 3320, this new song can be added to the queue. Alternatively, users or the system can dynamically add artistic units or components to the queue through other means.

Figure 35:
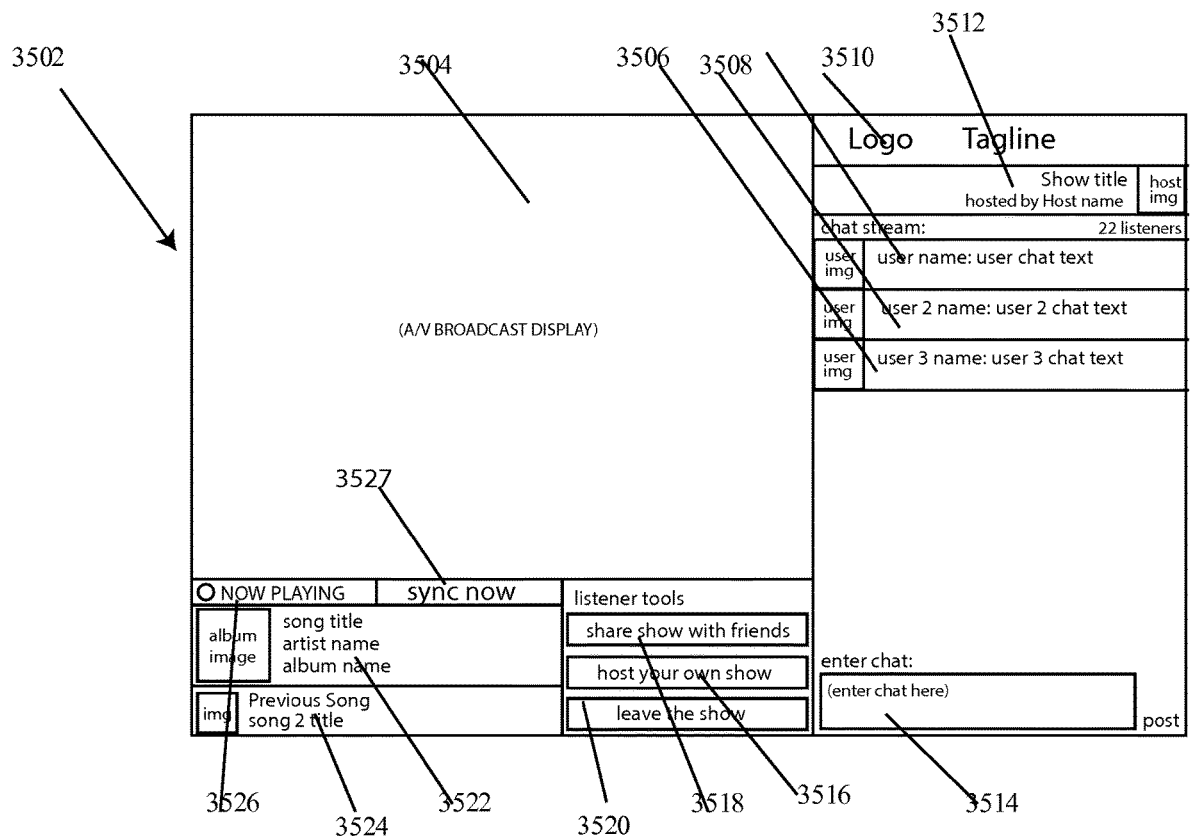
FIG. 35 is a screen shot of a screen used by those who consume content.

FIG. 35 shows a screen shot of the listener view of a show. In this view, there is a screen 3500 which includes a plurality of different sections such as an AV broadcast display section 3502. There is also a section for chat streams such as sections 3506, 3508, and 3509. There is also a section 3510 which lists the logo and tagline of a show that the user is listening to. Section 3512 is a section that lists the show title and name of the host. Section 3514 is a section wherein the user can enter his/her chat information as well. Section 3515 is a listener tools section which includes buttons 3518 to share a show with friends, button 3516 which allows the user to host his own show, and button 3520 which when pressed allows the user to leave the show.

Another section of this screen includes a "now playing" section which includes a section 3526 which lists that the song is now playing. Next another section 3522 lists the album or song image as well as the song title, the song name, and the album name. Another section 3524 shows the information about the previous song that was played.

While the screens shown in FIGS. 32-35 include examples of a way for users, hosts, and artists to interface with artistic components, other functionality may be added as well. These screens or interfaces 32-35 can be used with the processes and systems shown in FIGS. 1-31 above.

The different processes shown in FIGS. 4A, and 7A-22, and also described in FIGS. 23-31 could be used with any suitable system. The term "system" in this application comprises at a minimum at least one computerized device having at least one microprocessor such as microprocessor 222 shown in FIG. 2A. In at least one addition embodiment, the system can comprise at least one microprocessor 222 and additional components such as a memory 221. In at least one embodiment, additional components can include a mass storage 223, which comprises a hard drive. In at least one embodiment the "system" can include all of the components shown in FIG. 2A, that of the components comprising memory 221, microprocessor 222, mass storage 223, video output 226, power supply 224, communications port 225, and I/O ports 227. All of these components can be configured to be coupled to a motherboard 229.

In addition, the screens shown in FIGS. 32-35 are configured to be shown on an associated video screen which can be fed from either a remote server to the screen or from a local computer receiving instructions from a microprocessor on that computer. While some of the screens of FIGS. 32-35 are shown as separate screens, the functionality of each of these screens is configured to be transferred to any one of the other screens. The interfaces of FIGS. 32-35 create at least examples of interfaces which are of use with the process and system shown in FIGS. 1-31.

This system is configured to handle multiple simultaneous web sessions/connections so that multiple transactions can occur during a relatively short period of time. For example, the system is capable of automatically selecting different songs during simultaneous sessions so that thousands, or millions or even billions of songs can be selected simultaneously and then render an automatic recording of rewards and then an automatic transfer of rewards to a user from an artist. This system then makes it possible so that thousands, millions, or even billions of transactions can occur in a relatively short period of time (such as within an hour, ½ hour or even a minute of time allowing for a substantially large clearing of a large amount of transactions across the system.

Accordingly, while at least one embodiment of the present invention has been shown and described, it is obvious that many changes and modifications may be made thereunto without departing from the spirit and scope of the invention.

What is claimed is:

1. A process for hosting an entertainment streaming service comprising:
identifying content of at least one service provider system using a microprocessor on a server configured to identify at least one content unit of said stream of artist content by identifying an associated rhythm, meter, tone, and speech provided by said stream of artist content;
providing a link between a user and a content service broadcaster over a computer network;
providing a first channel of broadcast content;
providing at second channel of content separate from the broadcast channel;
providing a streamed service of artist content to said user on said second channel;
filtering said streamed service through an additional service provider having at least one microprocessor, wherein said at least one microprocessor catalogs artist content presented in said streamed service based upon rhythm, meter, tone, and speech;
crediting at least one of an account of said content service broadcaster, an account of said user, and an account of said artists based upon the artist's content being streamed over the computer network; and
interrupting content on said second channel to provide an announcement on said first channel;
wherein content from the first channel is provided from a location remote from the server, and content from the second channel is provided from a location remote from the server.

2. The process as in claim 1, wherein the microprocessor simultaneously credits said account of said content service broadcaster, said user and said artist based upon said artists content being streamed over the computer network.

3. The process as in claim 2, wherein the process further comprises identifying at least one song from a music stream.

4. The process as in claim 2, wherein the step of identifying at least one song comprises identifying via audio processing comprising at least one microprocessor, a tone, meter, rhythm of at least one song streamed by said content service broadcaster, and then automatically credit said account of said content service broadcaster, said user, and said artist based upon said artists content being streamed over the computer network.

5. The process as in claim 2, wherein said step of providing a link comprises providing a link for at least one thousand simultaneous users such that each user receives an individual stream of artist content from said at least one content service broadcaster.

6. A computer network comprising:
a) a content service broadcasting system comprising at least one microprocessor, at least one memory and at least one communication port configured to stream artist content to at least one user on a first channel wherein said at least one microprocessor is configured to identify at least one content unit of an artist content by identifying an associated rhythm, meter, tone, and speech provided by a stream of artist content and then filter said at least one content unit of said artist;

b) at least one user device having at least one microprocessor, at least one memory and at least one communication port configured to receive said stream of artist content;

c) at least one service provider system positioned in said computer network, said service provider system having at least one microprocessor, at least one memory and at least one communication port, said at least one service provider configured to identify individual artist content units from said stream of artist content on said first channel and then to automatically transfer credit to at least one account based upon at least one individual content unit of said stream of artist content; and d) at least one credit provider system configured to simultaneously calculate and then distribute credit to a plurality of different accounts, wherein said at least one credit provider system comprises at least one microprocessor, at least one memory, and at least one communication port;

a broadcast content provider system comprising at least one microprocessor, wherein said broadcast content provider is on a second channel, and wherein said broadcast content provider is configured to selectively interrupt said content on said first channel to provide at least one announcement to the user;

wherein the content from the first channel is provided from a location remote from the server and the content from the second channel is provided from a location that is remote from the server.

7. The network as in claim 6, wherein said microprocessor of at least one credit provider system is configured to simultaneously provide credit to at least two of the following accounts: a user's account, a computer generated content account, an artist's account, a music company account, a system account and a content service broadcaster account.

8. The network as in claim 6, wherein the network further comprises a first computer generated content stream system, a second computer generated content stream system in communication with said at least one content service broadcast system, at least one service provider system configured to receive at least one stream of artist content from said content service broadcast system, said first computer generated stream system, and said second computer generated stream system.

9. The network as in claim 8, further comprising a controller system, in communication with said at least one first computer generated content stream system, said at least one second computer generated content stream system, and at least one private provider, wherein an output of said private provider, and said first and said second computer generated content stream system are configured to feed into said service provider system, wherein the network further comprises:

a user based computerized device configured to communicate with said service provider system wherein said service provider system is configured to identify said artist content from said content streams.

* * * * *